US011468425B1

(12) United States Patent
Suthar et al.

(10) Patent No.: US 11,468,425 B1
(45) Date of Patent: Oct. 11, 2022

(54) ASYNCHRONOUSLY INITIATING ONLINE CHARGING TRIGGERS IN MOBILE NETWORKS

(71) Applicant: Cisco Technology, Inc., San Jose, CA (US)

(72) Inventors: Om Prakash Suthar, Bolingbrook, IL (US); Santhosh Shenoy Panambur, Karnataka (IN); Raghavendra Vidyashankar Suryanarayanarao, Bangalore South (IN); Tae Ryoung Hur, Tokyo (JP)

(73) Assignee: CISCO TECHNOLOGY, INC., San Jose, CA (US)

( * ) Notice: Subject to any disclaimer, the term of this patent is extended or adjusted under 35 U.S.C. 154(b) by 253 days.

(21) Appl. No.: 16/834,133

(22) Filed: Mar. 30, 2020

(51) Int. Cl.
*G06Q 20/32* (2012.01)
*G06Q 20/24* (2012.01)
(Continued)

(52) U.S. Cl.
CPC .......... *G06Q 20/325* (2013.01); *G06Q 20/24* (2013.01); *G06Q 20/3223* (2013.01);
(Continued)

(58) Field of Classification Search
CPC .. G06Q 20/325; G06Q 20/24; G06Q 20/3223; G06Q 20/3224; G06Q 20/3227;
(Continued)

(56) References Cited

U.S. PATENT DOCUMENTS 9,077,816 B2 7/2015 Li et al.
9,900,444 B1 2/2018 Seetharaman et al.
(Continued)

OTHER PUBLICATIONS

3GPP, "3rd Generation Partnership Project; Technical Specification Group Services and System Aspects; Architecture enhancements for control and user plane separation of EPC nodes; Stage 2 (Release 15)", 3GPP TS 23.214 V15.5.0, Dec. 2018, 92 pages.
(Continued)

*Primary Examiner* — Stephen J Clawson
(74) *Attorney, Agent, or Firm* — Edell, Shapiro & Finnan, LLC

(57) ABSTRACT

Techniques and mechanisms for asynchronously initiating online charging triggers in mobile networks are described. A control plane gateway or "GW-C" may obtain from a mobility management entity (MME) a create session request associated with an attach request for a user equipment (UE). The GW-C may send to an online charging system (OCS) a Gy credit-control request for requesting a quota of units (e.g. a resource usage quota) associated with a subscriber of the UE. Prior to sending the Gy credit-control request or obtaining a Gy credit-control answer, the GW-C may send to the MME a create session response which prompts an attach accept or reject of the attach request. The Gy credit-control request may be sent to the OCS during an attach procedure associated with the attach request for the UE or, alternatively, in response to receiving a user data packet of the session as a notification.

20 Claims, 15 Drawing Sheets

(51) Int. Cl.
    *H04M 15/00*     (2006.01)
    *H04L 12/14*     (2006.01)
    *H04W 8/20*     (2009.01)
    *H04W 88/16*     (2009.01)

(52) U.S. Cl.
    CPC ..... *G06Q 20/3224* (2013.01); *G06Q 20/3227* (2013.01); *H04L 12/14* (2013.01); *H04M 15/68* (2013.01); *H04W 8/205* (2013.01); *H04M 15/43* (2013.01); *H04W 88/16* (2013.01)

(58) Field of Classification Search
    CPC ....... H04L 12/14; H04M 15/68; H04M 15/43; H04W 8/205; H04W 88/16
    See application file for complete search history.

(56) References Cited

U.S. PATENT DOCUMENTS

| | | | |
|---|---|---|---|
| 2007/0253359 A1* | 11/2007 | Hall | H04W 76/12 370/328 |
| 2010/0015945 A1 | 1/2010 | Shuman et al. | |
| 2010/0074109 A1* | 3/2010 | Klingenbrunn | H04W 36/16 370/230 |
| 2011/0066530 A1 | 3/2011 | Cai et al. | |
| 2011/0075675 A1* | 3/2011 | Koodli | H04L 12/1485 370/401 |
| 2011/0125620 A1 | 5/2011 | Wisenoecker et al. | |
| 2011/0211465 A1* | 9/2011 | Farrugia | H04M 15/64 370/252 |
| 2012/0020345 A1* | 1/2012 | Zhou | H04L 12/1407 370/338 |
| 2012/0320801 A1* | 12/2012 | Yang | H04W 4/24 370/259 |
| 2013/0085909 A1 | 4/2013 | Mo et al. | |
| 2014/0199962 A1* | 7/2014 | Mohammed | H04W 4/60 455/406 |
| 2018/0309584 A1* | 10/2018 | Chai | H04L 67/14 |
| 2019/0007808 A1 | 1/2019 | Anulf et al. | |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.10.0, Dec. 2019, 417 pages.

Developing Solutions, Inc., "Policy Use Case—Resource Allocation", https://www.developingsolutions.com/solutions/use-cases/policy-use-case-resource-allocation/, downloaded Mar. 16, 2020, 3 pages.

Rabie, Karim, "Core Network Evolution—How CUPS changes the Call Flow?", https://www.netmanias.com/en/post/techdocs/13390/lte/core-network-evolution-how-cups-changes-the-call-flow, Apr. 2, 2018, 9 pages.

TecTec, "5.2 Packet Forwarding Model", https://itectec.com/spec/5-2-packet-forwarding-model/, downloaded Mar. 16, 2020, 29 pages.

ETSI, "Digital cellular telecommunications system (Phase 2+) (GSM); Universal Mobile Telecommunications System (UMTS); LTE; Telecommunication management; Charging management; Charging architecture and principles (3GPP TS 32.240 version 15.2.0 Release 15)", ETSI TS 132 240 V15.2.0, Jun. 2018, 61 pages.

ETSI, "5G; Telecommunication management; Charging management; 5G system; Services, operations and procedures of charging using Service Based Interface (SBI) (3GPP TS 32.290 version 15.1.0 Release 15)", ETSI TS 132 290 V15.1.0, Oct. 2018, 26 pages.

ETSI, "Digital cellular telecommunications system (Phase 2+) (GSM); Universal Mobile Telecommunications System (UMTS); LTE; Telecommunication management; Charging management; Diameter charging applications (3GPP TS 32.299 version 15.3.0 Release 15)", ETSI TS 132 299 V15.3.0, Jun. 2018, 210 pages.

3GPP, "3rd Generation Partnership Project; Technical Specification Group Services and System Aspects; Telecommunication management; Charging management; Online Charging System (OCS): Applications and interfaces (Release 15)", 3GPP TS 32.296 V15.0.0, Jun. 2018, 94 pages.

Cisco, "PDN Gateway Overview", P-GW Administration Guide, StarOS Release 21.3, downloaded Mar. 16, 2020, 110 pages.

L. Bertz, Ed.,"Diameter Credit-Control Application", Internet Engineering Task Force (IETF), Request for Comments: 8506, Obsoletes: 4006, Category: Standards Track, ISSN: 2070-1721, Mar. 2019, 130 pages.

V. Fajardo, Ed., "Diameter Base Protocol", Internet Engineering Task Force (IETF), Request for Comments: 6733, Obsoletes: 3588, 5719, Category: Standards Track, ISSN: 2070-1721, Oct. 2012, 152 pages.

H. Hakala et al., "Diameter Credit-Control Application", Network Working Group, Request for Comments: 4006, Category: Standards Track, Aug. 2005, 114 pages.

Cisco, "Control Plane and User Plane Separation (CUPS)", C78-741416-00, Oct. 2018, 4 pages.

\* cited by examiner

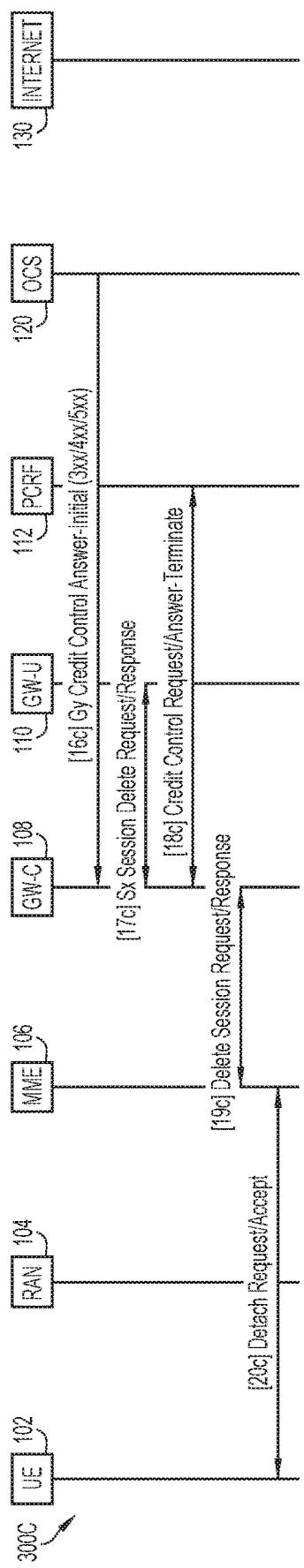
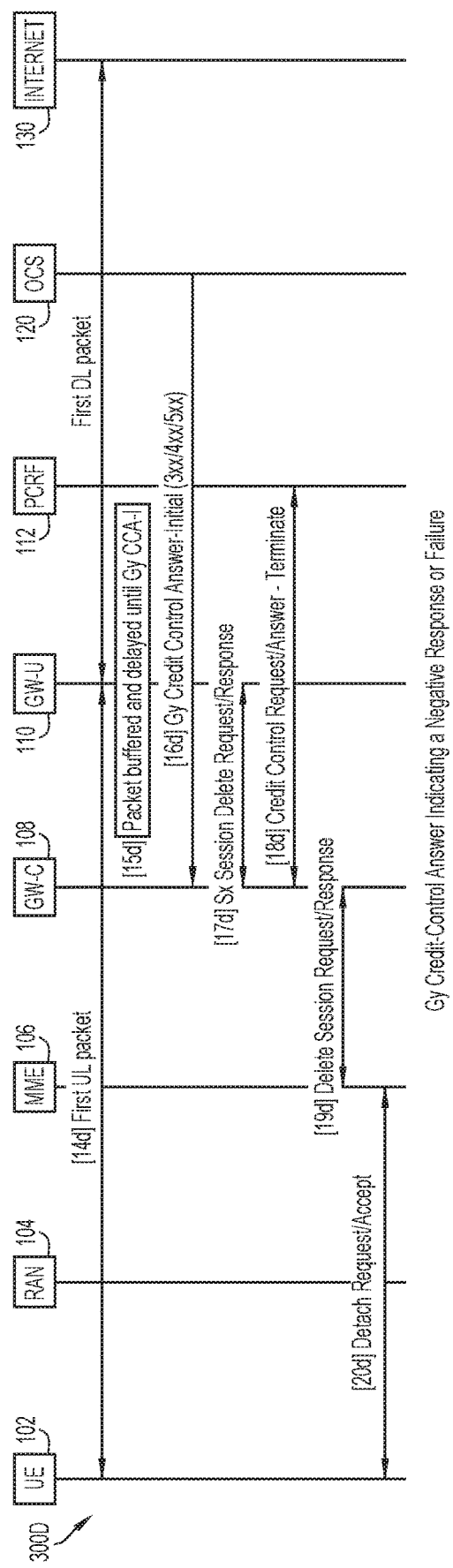

ASYNCHRONOUSLY INITIATING ONLINE CHARGING TRIGGERS IN MOBILE NETWORKS

TECHNICAL FIELD

The present disclosure relates generally to techniques and mechanisms for mobile networks, and more particularly to techniques and mechanisms for asynchronously initiating online charging triggers in mobile networks.

BACKGROUND

For mobile network operators, attach latency and call setup delay in mobile networks are significant Key Performance Indicators (KPIs) for network quality and subscriber experience.

In a Third Generation Partnership Project (3GPP) based mobile network, such as a Fourth Generation (4G), Long Term Evolution (LTE) based mobile network having an Evolved Packet Core (EPC), a Diameter protocol is used over a Gy interface for online charging associated with subscriber data traffic for a user equipment (UE). During attach and call setup procedures for the UE, interactions over Diameter interfaces introduce a significant delay which is primarily due to transport and processing delays at Diameter servers.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3C is a message flow diagram for describing a continuation of the message flow of FIG. 3A, for the case where a negative response or failure is received during UE registration in the modified Gy credit-control process with the OCS;

FIG. 3D is a message flow diagram for describing a continuation of the message flow of FIG. 3A, for the case where a negative response or failure is received after UE registration in the modified Gy credit-control process with the OCS;

DESCRIPTION OF EXAMPLE EMBODIMENTS

Figure 1:
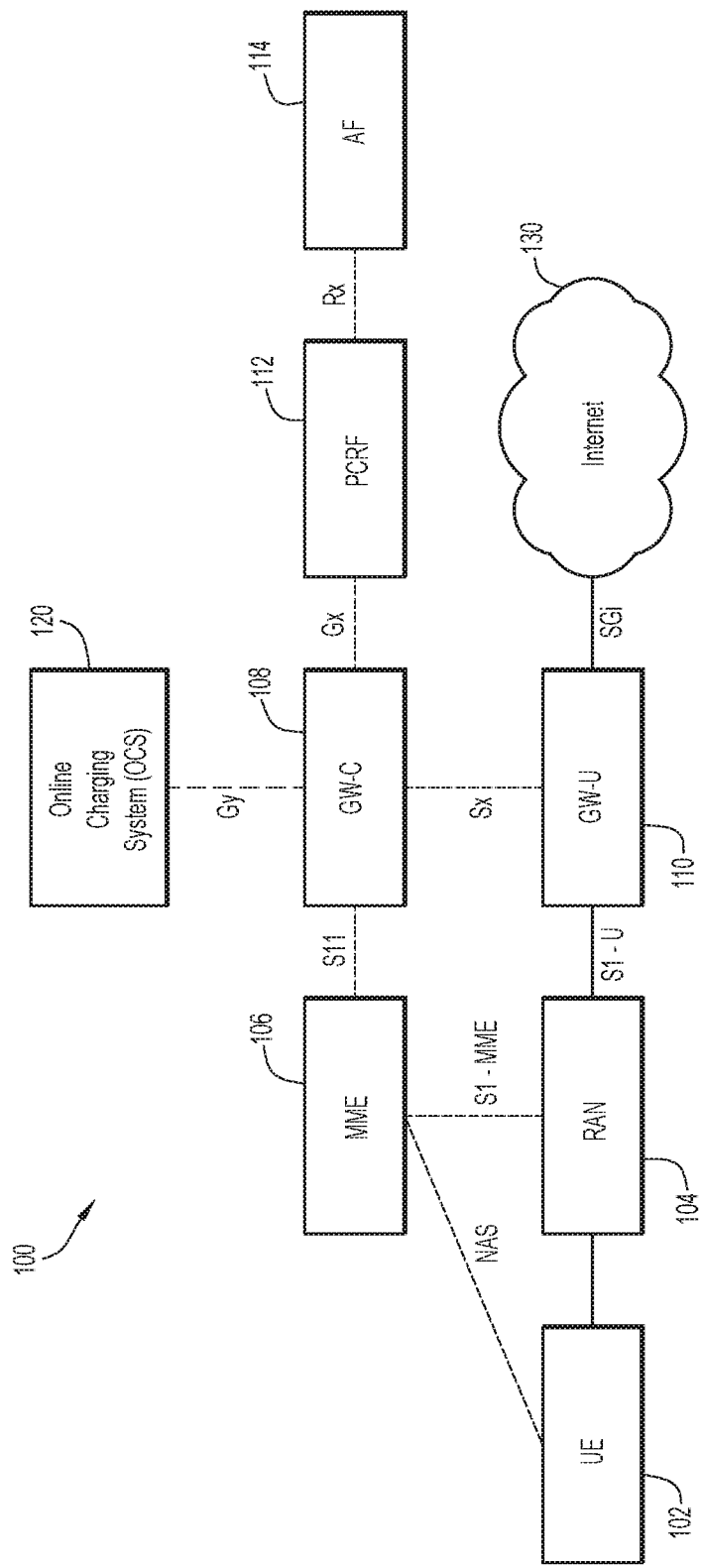
FIG. 1 is an illustrative representation of a network architecture of one type of a mobile network within which techniques and mechanisms of the present disclosure may be implemented.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

In a Third Generation Partnership Project (3GPP) based mobile network, such as a Fourth Generation (4G), Long Term Evolution (LTE) based mobile network having an Evolved Packet Core (EPC), a Diameter protocol is used over a Gy interface towards an Online Charging System (OCS) for online charging associated with subscriber data traffic for a user equipment (UE). During attach and call setup procedures for the UE, interactions over Diameter interfaces introduce a significant delay which is primarily due to transport and processing delays at Diameter servers.

It has been observed that the dependency of the attach procedure on an initial Gy transaction introduces an additional, unnecessary delay in call setup time, and this delay may be avoided or substantially reduced by making the initial Gy transaction asynchronous to the attach procedure.

Accordingly, techniques and mechanisms of the present disclosure relate to an asynchronous handling of Gy sessions in 3GPP based mobile networks, e.g., 3GPP based mobile networks having an EPC and Control and User Plane Separation (CUPS) architectures. Such techniques and mechanisms may provide for or lead to a significant improvement in call setup time in such networks.

In one illustrative example of the present disclosure, a control plane gateway or "GW-C" of a mobile network may obtain from a mobility management entity (MME) a create session request associated with an attach request for a UE. The GW-C may send to an Online Charging System (OCS) a Gy credit-control request for requesting a quota of units (e.g. a resource usage quota to be reserved) associated with a subscriber of the UE. Prior to sending the Gy credit-control request or obtaining a Gy credit-control answer to the Gy credit-control request, the GW-C may send to the MME a create session response, which prompts an attach accept or reject of the attach request for the UE. In some implementations, the Gy credit-control request may be sent to the OCS during an attach procedure associated with the attach request for the UE. In addition or as an alternative, the Gy credit-control request may be sent to the OCS in response to receiving a user data packet of the session for the UE as a notification (e.g. a first chargeable data packet), forwarded from a user plane gateway or "GW-U."

The techniques and mechanisms of the present disclosure may be applied to and/or implemented in other networks as well, including next generation networks, such as Fifth Generation (5G) networks.

More detailed and alternative techniques and implementations are provided herein as described below.

EXAMPLE EMBODIMENTS

FIG. 1 is an illustrative representation of a network architecture 100 of a Third Generation Partnership Project (3GPP) based mobile network. The mobile network of FIG. 1 may be an Evolved Packet System (EPS) network which includes an Evolved Universal Terrestrial Radio Access Network (E-UTRAN) for Long-Term Evolution (LTE) based access and an Evolved Packet Core (EPC) network having a Control and User Plane Separation (CUPS) architecture. More particularly, network architecture 100 of the mobile network may include an E-UTRAN or RAN 104, a Mobility Management Entity (MME) 106, a System Architecture Evolution Gateway-Control Plane (SAEGW-C) or GW-C 108, a System Architecture Evolution Gateway-User Plane (SAEGW-U) or GW-U 110, a Policy and Charging Rules Function (PCRF) 112, and an Application Function (AF) 114.

A user equipment (UE) 102 may access the mobile network via RAN 104 which includes a plurality of base stations, such as eNodeBs (eNBs). UE 102 which is configured to operate for communication in the mobile network may be any suitable type of device, such as a cellular telephone, a smart phone, a tablet device, a gaming device or application, an Internet of Things (IoT) device, and a Machine-To-Machine (M2M) device, to name but a few. Communications with nodes or devices on one or more packet data networks, such as the Internet 130, may be provided via GW-U 110.

A prepaid charging services model has been shown to be very successful in mobile networks, as network operators offering prepaid charging services have experienced a substantial growth of their customer base and revenues. For credit-control of prepaid charging services for UE 102, an Online Charging System (OCS) 120 may be utilized in connection with the mobile network.

In general, credit-control may be considered to be a real-time mechanism that directly interacts with an account and controls or monitors the charges related to service usage. Credit-control involves a process which may include checking whether or not credit is available, reserving credits for a credit reservation, deducting credit from an account when service is completed, and/or refunding of unused reserved credit.

A Diameter application may be used to implement real-time credit-control for a variety of end-user services, such as network access, Session Initiation Protocol (SIP) services, messaging services, and download services. Diameter credit-control standards are defined by the Internet Engineering Task Force (IETF) in Request For Comments (RFC) 4006 which has been updated in RFC 8506. A Diameter credit-control application may involve an online client that requests resource allocation and reports credit-control information to OCS 120 using transactions over a Gy interface. A Diameter credit-control server may operate as a prepaid server, performing real-time rating and credit-control. The server may be located in a home domain and accessed by Service Elements or Diameter Authentication, Authorization and Accounting (AAA) servers in real-time, for the purpose of price determination and credit-control, even before a service event is delivered to the end user. A Diameter credit-control client may operate to interact with such a credit-control server. In particular, the client may operate to monitor the usage of granted quota according to instructions returned by the credit-control server.

During attach and call setup procedures for UE 102, a Gy credit-control process involving message exchanges between GW-C 108 and OCS 120 (having one or more servers or OCS servers) may be performed. It has been observed that initial Gy transaction processing with OCS 120 is contributing to a relatively significant delay in the attach and call setup procedures. This issue is illustrated in more detail in relation to FIG. 2.

Figure 2:
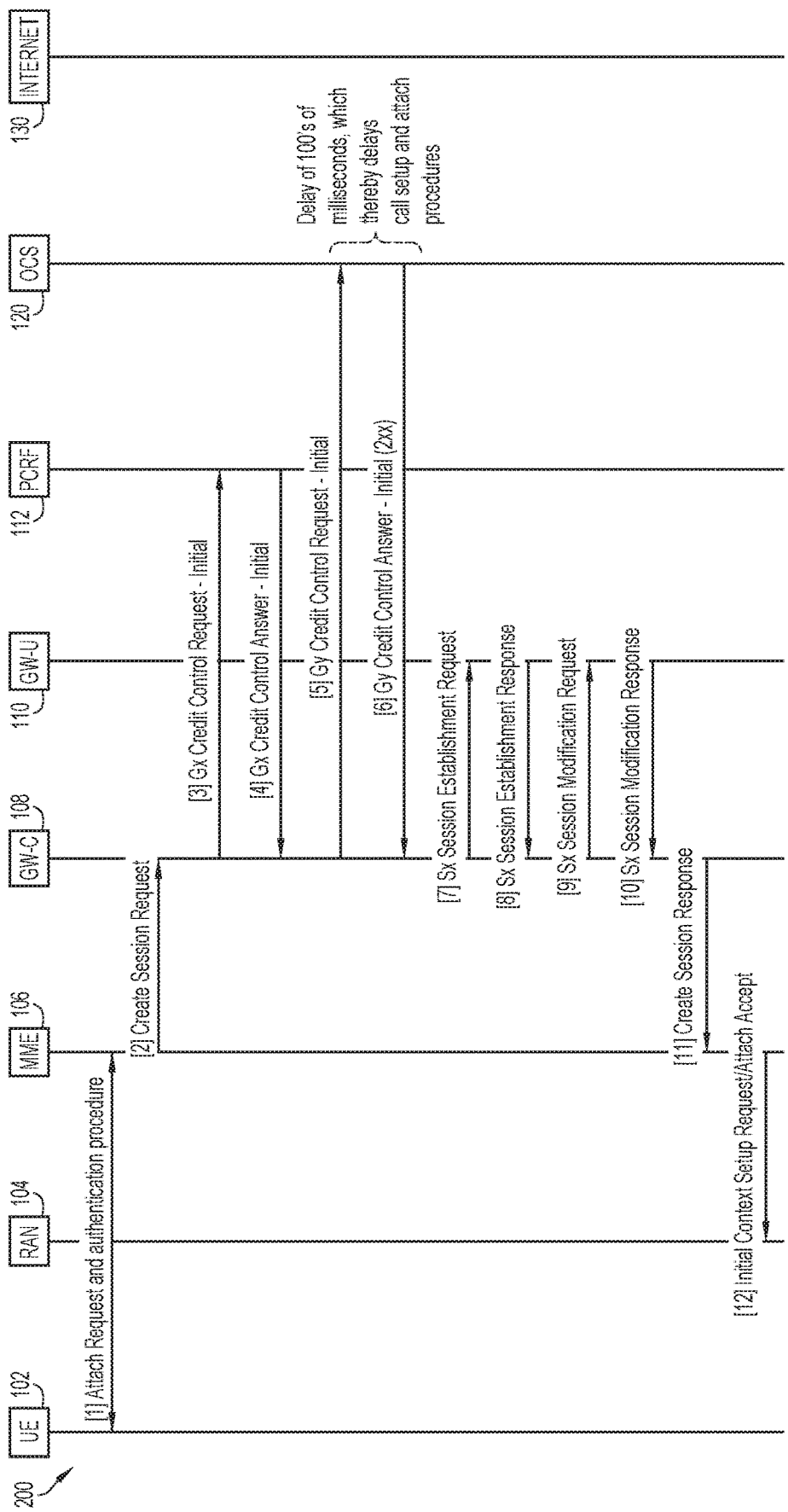
FIG. 2 is a message flow diagram for describing a message flow for attach and call setup procedures for a user equipment (UE) in the mobile network of FIG. 1, where the attach and call setup procedures involve a standard Gy credit-control process with an Online Charging System (OCS)

FIG. 2 is a message flow diagram 200 for describing a message flow for attach and call setup procedures for UE 102 in the mobile network of FIG. 1, where the attach and call setup procedures involve a "standard" Gy credit-control process with OCS 120.

In message flow diagram 200A of FIG. 2, UE 102 may send to RAN 104 a message indicating an attach request (step 1 of FIG. 2). The message indicating the attach request may prompt an attach procedure and authentication procedure for UE 102. In some implementations, the message may be an EPS Mobility Management (EMM) message—attach request, with an EPS Session Management (ESM) container that carries a Packet Data Network (PDN) Connectivity Request. The message may be received and processed by MME 106 via RAN 104. In response, MME 106 may select GW-C 108 and send to GW-C 108 a message indicating a create session request (step 2 of FIG. 2).

GW-C 108 may receive and process the message indicating the create session request. GW-C 108 may perform a Gx credit-control process with PCRF 112. Here, GW-C 108 may send to PCRF 112 a message indicating a Gx credit-control request—initial (step 3 of FIG. 2). PCRF 112 may receive this message for processing and, in response, and send to GW-C 108 a message indicating a Gx credit-control answer—initial (step 4 of FIG. 2). In further response, GW-C 108 may perform a (e.g. standard) Gy credit-control process with OCS 120. Here, GW-C 108 may send to OCS 120 a message indicating a Gy credit-control request—initial (CCR-I) for requesting a quota of units associated with a subscriber of UE 102 (step 5 of FIG. 2). OCS 120 may receive this message and process the request. In response, OCS 120 may send to GW-C 108 a message indicating a Gy credit-control answer—initial (CCA-I) (step 6 of FIG. 2). GW-C 108 may receive this message and thereby obtain the answer. The answer may include a granted quota of units associated with the subscriber of UE 102. An observable delay between the sending and receiving of messages in steps 5-6 is largely due to transport and processing delays at Diameter servers of OCS 120.

After obtaining the answer having the granted quota of units, GW-C 108 may select GW-U 110 as the user plane for the session for UE 102. GW-C 108 may send to GW-U 110 a message indicating an Sx session establishment request for establishing a session with GW-U 110 (step 7 of FIG. 2). The message indicating the Sx session establishment request may include rules for provisioning GW-U 110 for handling data traffic for UE 102. The message indicating the Sx session establishment request including the rules may include, for example, a Packet Detection Rule (PDR), a Forwarding Action Rule (FAR), and a Usage Reporting Rule (URR) based on the granted quota associated with the subscriber. GW-U 110 may receive this message and process the Sx session establishment request, and send to GW-C 108 an Sx session establishment response (step 8 of FIG. 2). GW-C 108 may receive this message and process the Sx session establishment response. Subsequently, GW-C 108 may send to GW-U 110 a message indicating an Sx session modification request for modifying the session (step 9 of FIG. 2). GW-U 110 may receive this message and process the Sx session modification request, and send to GW-C 108 a message indicating an Sx session modification response (step 10 of FIG. 2). GW-C 108 may receive the message from GW-U 110 and process the Sx session modification response. GW-C 108 may then send to MME 106 a message indicating a create session response (step 11 of FIG. 2). MME 106 may receive this message and process the create session response. MME 106 may then send to RAN 104 a message indicating an initial context setup request, and including an attach accept or reject of attach request (step 12 of FIG. 2). This message will prompt completion of the attach procedure.

As is apparent, in the attach and call setup procedures which involve the standard Gy credit-control process in FIG. 2, the initial Gy transaction with OCS 120 (see e.g. step 5 of FIG. 2) is triggered as part of the attach procedure and requires a successful answer from OCS 120 (see e.g. step 6 of FIG. 2) for continuing the procedure until its completion. Here, the dependency of the attach procedure on the initial Gy transaction introduces an additional delay in call setup time. This additional delay, caused by transport and processing delays at Diameter servers, may be from about 100 milliseconds to a few seconds in total. Note that 3GPP specifications are not clear about how such Gy transactions should be handled during an initial attach of a UE in a 4G, LTE/EPC based mobile network having a CUPS architecture.

As is apparent, the dependency of the attach procedure on an initial Gy transaction introduces an additional, unnecessary delay in call setup time. This delay may be avoided or substantially reduced by making the initial Gy transaction asynchronous to the attach procedure.

Accordingly, techniques and mechanisms of the present disclosure relate to an asynchronous handling of Gy sessions in mobile networks, e.g., 3GPP based mobile networks having an EPC and CUPS architectures. Such techniques and mechanisms may provide for or lead to a significant improvement in call setup time in such mobile networks.

In the present disclosure, two basic example approaches are provided for facilitating the initial Gy transaction with the OCS asynchronously. These basic approaches may be implemented independently or in combination with each other, and, of course, modified or expanded upon as one ordinarily skilled in the art would readily appreciate.

The two basic example approaches may be referred to herein as (1) an asynchronous Gy transaction "on attach" or registration; and (2) an asynchronous Gy transaction "on data." In some implementations, basic approach (1) may be utilized for a first operating mode or condition (e.g. while the UE is "roaming") and basic approach (2) may be utilized for a second operating mode or condition (e.g. while the UE is operating in its "home" network).

Figure 3A:
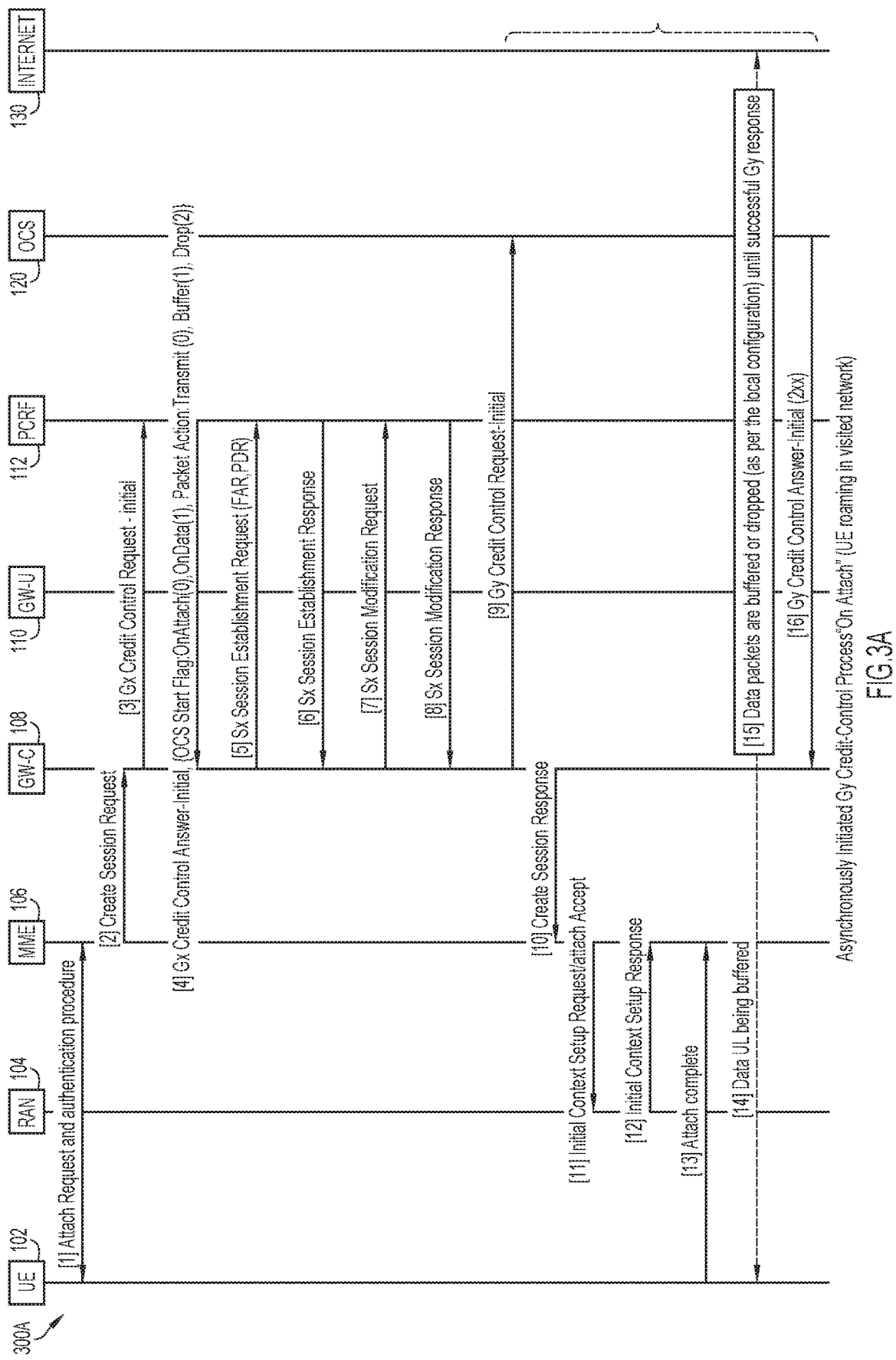
FIG. 3A is a message flow diagram for describing a message flow for attach and call setup procedures for a UE in a mobile network according to some implementations of the present disclosure, where the attach and call setup procedures involve a modified Gy credit-control process with the OCS (e.g. an asynchronous Gy credit-control process "on attach")

FIG. 3A is a message flow diagram 300A for describing a message flow for attach and call setup procedures for UE 102 in a mobile network according to some implementations of the present disclosure, where the attach and call setup procedures involve a modified Gy credit-control process with OCS 120 (e.g. an asynchronous Gy credit-control process "on attach"). In some implementations, GW-C 108, GW-U 110, PCRF 112, and OCS 120 (which may include an Online Charging Function or "OCF") may be configured for operation and procedures as described according to the present disclosure but otherwise compatible with 3GPP specifications.

In message flow diagram 300A of FIG. 3A, UE 102 may send to RAN 104 a message indicating an attach request (step 1 of FIG. 3A). The message indicating the attach request may prompt an attach procedure and authentication procedure for UE 102. In some implementations, the message may be an EMM message—attach request, with an ESM container that carries a PDN Connectivity Request. The message may be received and processed by MME 106 via RAN 104. In response, MME 106 may select GW-C 108 and send to GW-C 108 a message indicating a create session request (step 2 of FIG. 3A). GW-C 108 may receive the message and thereby obtain the create session request for processing.

Here, GW-C 108 may perform a Gx credit-control process with PCRF 112. GW-C 108 may send to PCRF 112 a message indicating a Gx credit-control request—initial (step 3 of FIG. 3A). PCRF 112 may receive this message for processing and, in response, and send to GW-C 108 a message indicating a Gx credit-control answer—initial (step 4 of FIG. 3A). The Gx credit-control answer may include one or more indications indicating whether support exists for a modified Gy credit-control process with OCS 120. The modified Gy credit-control process that is indicated may include an asynchronous initial Gy transaction according to some implementations of the present disclosure.

In some implementations, the one or more indications indicating that support exists for the modified Gy credit-control process (e.g. which includes the asynchronous initial Gy transaction) may further indicate whether to send the Gy credit-control request to OCS 120 during an attach procedure associated with the attach request for UE 102. In addition, or as an alternative, the one or more indications indicating that support exists for the modified Gy credit-control process (e.g. which includes the asynchronous initial Gy transaction) may further indicate whether to send the Gy credit-control request to OCS 120 in response to receiving a user data packet for UE 102 as a notification (e.g. a first chargeable data packet). In some implementations, when the one or more indications indicating that support exists for the modified Gy credit-control process are excluded or not present in the Gx credit-control answer, then the modified Gy credit-control process with OCS 120 is not supported, but rather the "standard Gy credit-control process" with OCS 120 is available (see e.g. the method of FIG. 2).

In more specific implementations, when UE 102 is roaming in a non-home or visited network, the one or more indications indicate that support exists for the modified Gy credit-control process to send the Gy credit-control request to OCS 120 during the attach procedure associated with the attach request for UE 102. Here, GW-C 108 may be configured to operate in accordance with these one or more indications (or instructing indications). In addition, or as an alternative, when UE 102 is operating in a home network, the one or more indications indicate that support exists for the modified Gy credit-control process to send the Gy credit-control request to OCS 120 in response to receiving a user data packet for UE 102 as a notification. Here, again, GW-C 108 may be configured to operate in accordance with these one or more indications (or instructing indications).

In some implementations, the Gx credit-control answer from PCRF 112 may include one or more additional indications indicating a manner in which to process one or more user data packets of the session for UE 102 at GW-U 110, for any user data packets received prior to re-provisioning GW-U 110 based on the granted quota of units subsequently obtained from a Gy credit-control answer from OCS 120. These one or more additional indications may indicate initial user data packet processing according to one of (1) "transmit" (e.g. communicate or forward one or more received user data packets as normal); (2) "buffer" (e.g. buffer the one or more received user data packets at GW-U 110 until further notice); or (3) "drop" (e.g. drop the one or more received user data packets at GW-U 110 until further notice). Here, GW-C 108 may be configured to operate in accordance with these one or more indications (or instructing indications) to provision GW-U 110 to perform such initial user data packet processing, and GW-U 110 may be configured to perform such initial user data packet processing according to such provisioning.

In the specific implementation as indicated in FIG. 3A, the Gx credit-control answer—initial in step 4 may include a first indication referred to as an "OCS Start Flag" which may be set to a first value of "0"=asynchronous initial Gy transaction "on attach" or a second value of "1"=asynchronous initial Gy transaction "on data." The OCS Start Flag may be included as a new Attribute-Value Pair (AVP) in the messaging. If this flag or AVP is not received, GW-C 108 may be configured to utilize its local configurations. Even further in the specific implementation of FIG. 3A, the Gx credit-control answer—initial may include a second indication referred to as a "Packet Action" for initial user data packet processing at GW-U 110, where the second indication may be set to a first value of "0"=Transmit, a second value of "1"=Buffer, or a third value of "2"=Drop. This "Packet Action" indication is only applicable where the OCS Start Flag=0, and may also be included as a new AVP in the messaging. Again, if this indication or AVP is not received, GW-C 108 may be configured to utilize its local configurations.

In the present scenario of FIG. 3A, the first indication or OCS Start Flag is set to the first value of "0" for indicating the asynchronous initial Gy transaction "on attach" and the second indication or "Packet Action" is set to the second value of "1"=Buffer. Accordingly, GW-C 108 may operate in accordance with the instructing indication to perform the asynchronous initial Gy transaction "on attach" where user data packets are buffered at GW-U 110 until the credit-control answer is obtained. In some implementations, as is the case of FIG. 3A, the asynchronous initial Gy transaction "on attach," which will be initiated by GW-C 108 during the attach procedure, will be more specifically initiated by GW-C 108 in step 9 of FIG. 3A after or in response to completion of session establishment and modification procedures with GW-U 110 in steps 5 through 8 of FIG. 3A. In other implementations, the asynchronous initial Gy transaction may be initiated by GW-C 108 or triggered at some other point in time during the attach procedure.

Accordingly, after obtaining the Gx credit-control answer from PCRF 112, GW-C 108 may select GW-U 110 as the user plane for the session for UE 102. GW-C 108 may send to GW-U 110 a message indicating an Sx session establishment request for establishing a session with GW-U 110 (step 5 of FIG. 3A). The message indicating the Sx session establishment request may include rules for provisioning GW-U 110 for handling data traffic for UE 102. In some implementations, the Sx session establishment request may include a PDR, a FDR, or both. However, the Sx session establishment request will exclude a Usage Reporting Rule (URR) that is based on a granted quota of units associated with a subscriber of UE 102, as such data have not (yet) been received from OCS 120. Thus, the session may be established with the PDR and the FDR.

In some implementations, the message indicating the Sx session establishment request in step 5 of FIG. 3A may further include one or more rules and/or actions for provisioning GW-U 110 for initial user data packet processing associated with the session for UE 102, for any one or more user data packets received prior to a re-provisioning of GW-U 110 based on granted quota of units subsequently obtained from the Gy credit-control answer from OCS 120.

GW-U 110 may receive this message and process the Sx session establishment request, and send to GW-C 108 an Sx session establishment response (step 6 of FIG. 3A). GW-C 108 may receive this message and thereby obtain the Sx session establishment response. Subsequently, GW-C 108 may send to GW-U 110 a message indicating an Sx session modification request for modifying the session (step 7 of FIG. 3A). GW-U 110 may receive this message and process the Sx session modification request, and send to GW-C 108 a message indicating an Sx session modification response (step 8 of FIG. 3A). GW-C 108 may receive the message from GW-U 110 and process the Sx session modification response.

In response, GW-C 108 may send to OCS 120 a message indicating a Gy credit-control request—initial (CCR-I) (step 9 of FIG. 3A). This credit-control request may be for requesting a quota of units (e.g. a resource usage quota to be reserved) associated with the subscriber of UE 102. Here, GW-C 108 may request the quota of units for a default rating group (e.g. as provisioned by the operator). This request may ensure that the subscriber has sufficient dosage to continue with data usage. Note that this message may mark the asynchronous initiating or triggering of the transaction, initiated by GW-C 108 after or in response to completion of session establishment and modification procedures with GW-U 110. OCS 120 may receive the message and begin processing the Gy credit-control request.

Meanwhile, GW-C 108 may send to MME 106 a message indicating a create session response (step 10 of FIG. 3A). Specifically, this message may indicate a GTPv2_Create_Session_Response which is sent on the S11 interface. As is apparent, GW-C 108 sends this message to MME 106 prior to obtaining from OCS 120 a Gy credit-control answer to the Gy credit-control request. MME 106 may receive this message and process the create session response. The create session response may prompt an attach accept or reject of the attach request for UE 102. MME 106 may then send to RAN 104 a message indicating an initial context setup request, and further indicating an attach accept or reject associated with the attach request for UE (step 11 of FIG. 3A). RAN 104 may receive the message and processing the initial context setup request and send to MME 106 a message indicating an initial context setup response (step 12 of FIG. 3A). Further processing (e.g. the establishing of a default bearer) causes UE 102 to send to MME 106 via RAN 104 a message indicating an attach complete, which indicates completion of the attach procedure (step 13 of FIG. 3A).

Subsequently, after completion of the procedures, one or more user data packets in the session for UE 102 may be communicated via GW-U 110 (step 14 of FIG. 3A). During this time, GW-U 110 remains provisioned with one or more rules and/or actions for initial user data packet processing. In the present scenario of FIG. 3A, GW-U 110 remains provisioned with rules and/or actions for buffering (any) one or more received user data packets (step 15 of FIG. 3A), until the Gy credit-control answer is received by GW-C 108. GW-U 110 buffers (any) one or more user data packets received at GW-U 110 until it is re-provisioned by GW-C 108 based on the granted quota of units obtained from the Gy credit-control answer.

Subsequently, OCS 120 may send to GW-C 108 a message indicating a Gy credit-control answer—initial (step 16 of FIG. 3A). GW-C 108 may receive this message and thereby obtain the Gy credit-control answer. At GW-C 108, the delay in receiving the Gy credit-control answer from OCS 120 occurs largely due to transport and processing delays at the Diameter servers of OCS 120. In the example scenario of FIG. 3A, the Gy credit-control answer in step 16 indicates a successful response ("2XX"). Here, the Gy credit-control answer may include a granted quota of units associated with the subscriber of UE 102.

Figure 3B:
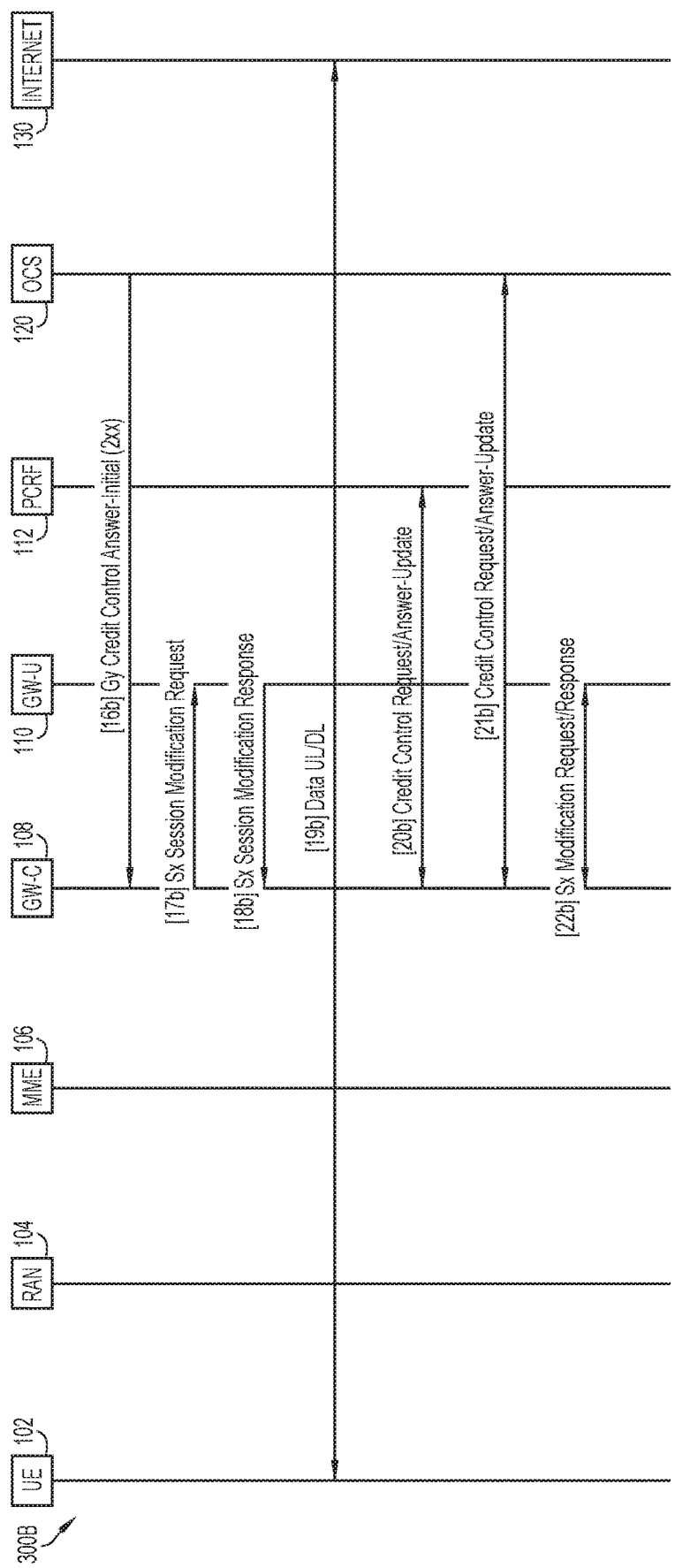
FIG. 3B is a message flow diagram for describing a continuation of the message flow of FIG. 3A, for the case where a successful answer is received in the modified Gy credit-control processing with the OCS.

FIG. 3B is a message flow diagram 300B for describing a continuation of the message flow of FIG. 3A, for the case where a successful answer is received in the modified Gy credit-control process with OCS 120. In FIG. 3B, OCS 120 sends to GW-C 108 the message indicating the Gy credit-control answer—initial ("2XX") which includes the granted quota of units (step 16b of FIG. 3B which corresponds to step 16 of FIG. 3A). This Gy credit-control answer may be received either before or after an attach complete is sent. After obtaining the Gy credit-control answer having the granted quota of units, GW-C 108 may send to GW-U 110 a message indicating an Sx session modification request for modifying the session (step 17b of FIG. 3B). The Sx session modification request may include one or more rules and/or actions for provisioning GW-U 110 in relation to the session for UE 102 for steady-state user data packet processing. In particular, the Sx session modification request may include the URR which is based on the granted quota of units, for provisioning GW-U 110 in relation to the session for UE 102. GW-U 110 may receive this message and process the Sx session modification request, and send to GW-C 108 a message indicating an Sx session modification response (step 18b of FIG. 3B). GW-C 108 may receive the message from GW-U 110 to thereby obtain the Sx session modification response.

After completion of these procedures, one or more user data packets in the session for UE 102 may be communicated via GW-U 110 (step 19b of FIG. 3B). During this time, GW-U 110 remains provisioned with the one or more rules and/or actions for steady-state user data packet processing. GW-C 108 may send to PCRF 112 a message indicating a credit-control request—update for providing one or more updates (step 20b of FIG. 3B). PCRF 112 may receive the message and process the credit-control request—update, and send to GW-C 108 a message indicating a credit-control answer—update (also step 20b of FIG. 3B). GW-C 108 may receive the message and thereby obtain the credit-control answer—update for processing. GW-C 108 may send to OCS 120 a message indicating a credit-control request—update for providing one or more updates (step 21b of FIG. 3B). OCS 120 may receive the message and process the credit-control request—update, and send to GW-C 108 a message indicating a credit-control answer—update (also step 21b of FIG. 3B). GW-C 108 may receive the message and thereby obtain the credit-control answer—update for processing. GW-C 108 may send to GW-U 110 a message indicating an Sx session modification request (step 22b of FIG. 3B). GW-U 110 may receive the message and process the Sx session modification request, and send to GW-C 108 a message indicating an Sx session modification response (also step 22b of FIG. 3B). GW-C 108 may receive the message and thereby obtain the Sx session modification request for processing.

In some circumstances in FIG. 3A, OCS 120 may respond with a failure code (e.g. in the ranges of "3XX," "4XX," or "5XX"). According to some implementations, the failures may be handled in a graceful manner, terminating a session or providing a fallback to local configurations of GW-C 108.

FIG. 3C is a message flow diagram 300C for describing a continuation of the message flow of FIG. 3A, for the case where a negative response or failure is received during UE registration in the modified Gy credit-control process with OCS 120. Thus, steps 16c to 20c of FIG. 3C relate to failure handling steps during UE registration or attach. In FIG. 3C, OCS 120 sends to GW-C 108 the message indicating the Gy credit-control answer—initial ("3XX," "4XX," or "5XX") (step 16c of FIG. 3C, which is a negative response which replaces step 16 of FIG. 3A). After obtaining the Gy credit-control answer having the negative response or failure, GW-C 108 may send to GW-U 110 a message indicating an Sx session delete request for deleting the session (step 17c of FIG. 3C). GW-U 110 may receive this message and process the Sx session delete request, and send to GW-C 108 a message indicating an Sx session delete response (also step 17c of FIG. 3C). GW-C 108 may receive the message from GW-U 110 to thereby obtain the Sx session delete response for processing. GW-C 108 may send to PCRF 112 a message indicating a credit-control request—terminate for termination (step 18c of FIG. 3C). PCRF 112 may receive the message and process the credit-control request—terminate, and send to GW-C 108 a message indicating a credit-control answer—terminate (also step 18c of FIG. 3C). GW-C 108 may receive the message and thereby obtain the credit-control answer—terminate for processing. Subsequently, GW-C 108 may send to MME 106 a message indicating a delete session request (step 19c of FIG. 3C). MME 106 may receive the message and process the delete session request, and send to GW-C 108 a message indicating a delete session response (also step 19c of FIG. 3C). GW-C 108 may receive the message and thereby obtain the delete session request for processing. Subsequently, MME 106 may send to RAN 104/UE 102 a message indicating a detach request (step 20c of FIG. 3C). RAN 104/UE 102 may receive the message and process the detach request, and send to MME 106 a message indicating a detach accept (also step 20c of FIG. 3C). MME 106 may receive the message and thereby obtain the detach accept for processing.

FIG. 3D is a message flow diagram 300D for describing a continuation of the message flow of FIG. 3A, for the case where a negative response or failure is received after UE registration in the modified Gy credit-control process with OCS 120. Thus, steps 14d to 20d are those performed after UE 102 is successfully registered or attached but where OCS 120 has responded with a failure code. In FIG. 3D, a first user data packet(s) (UL or DL) may be communicated via GW-U 110 (step 14d of FIG. 3D). The first user data packet(s) may be buffered and delayed for communication at GW-U 110 (step 15d of FIG. 3D). Sometime subsequently, OCS 120 may send to GW-C 108 the message indicating the Gy credit-control answer—initial ("3XX," "4XX," or "5XX") (step 16d of FIG. 3D, which is a negative response which replaces step 16 of FIG. 3A). After obtaining the Gy credit-control answer having the negative response or failure, steps 17d through 20d of FIG. 3D which are the same as or similar to steps 17c through 20c of FIG. 3C are performed.

In the previously described methods of FIGS. 3A-3D, the Gy transaction is initiated by requesting the quota for a default rating group. This quota may or may not be subsequently consumed based on the user data packet(s) transmitted by UE 102. UE 102 may also initiate a user data packet for different rating group that may result in another one or more Gy transactions (e.g. Gy credit-control request—updates) towards OCS 120, which may increase the total number of transactions towards OCS 120 (e.g. in a dense mobile network).

Accordingly, in some implementations, the techniques and mechanisms of the present disclosure may provide for the ability to initiate a Gy transaction on the arrival of a first chargeable data packet (whether uplink or "UL" or downlink or "DL") of the session of UE 102. This may reduce the total number of transactions towards OCS 120. Here, the attach and call setup procedures may involve a modified Gy credit-control process referred to as an asynchronous Gy credit-control process "on data."

Figure 4A:
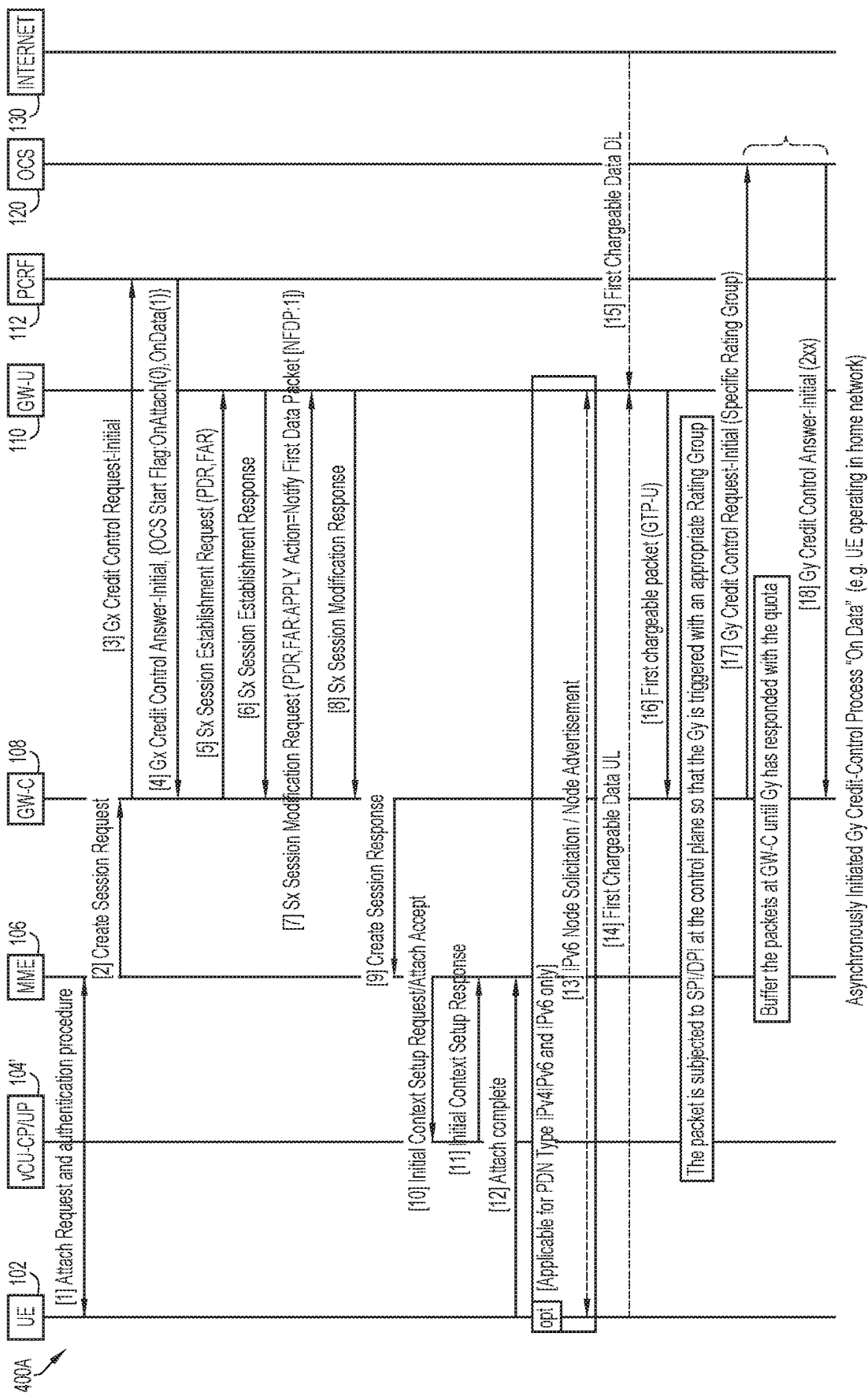
FIG. 4A is a message flow diagram for describing a message flow for attach and call setup procedures for a UE in a mobile network according to some implementations of the present disclosure, where the attach and call setup procedures involve a modified Gy credit-control process with the OCS (e.g. an asynchronous Gy credit-control process "on data")

FIG. 4A is a message flow diagram 400A for describing a message flow for attach and call setup procedures for a UE in a mobile network according to some implementations of the present disclosure, wherein the attach and call setup procedures involve a modified Gy credit-control process with OCS 120 (e.g. an asynchronous Gy credit-control process "on data"). Further included in the network architecture for this message flow is a virtualized central unit (vCU) 104' for control plane (CP) and user plane (UP). Again, in some implementations, GW-C 108, GW-U 110, PCRF 112, and OCS 120 with the OCF may be configured for operation and procedures as described according to the present disclosure but otherwise compatible with 3GPP specifications.

In FIG. 4A, an interface between GW-C 108 and GW-U 110 is utilized to send the first chargeable data packet to trigger a Gy transaction. This interface may be an Sx-u General Packet Radio Services (GPRS) Tunneling Protocol (GTP-u) interface. Note that 3GPP specifications define the use of the Sx-u interface for the purpose IPv6 Network Solicitation (NS) packets in the UL and a method to initiate a Downlink Data Notification (DDN) for EMM idle subscriber session in the DL direction only.

In message flow diagram 400A of FIG. 4A, UE 102 may send a message indicating an attach request (step 1 of FIG. 4A). The message indicating the attach request may prompt an attach procedure and authentication procedure for UE 102. In some implementations, the message may be an EMM message—attach request, with an ESM container that carries a PDN Connectivity Request. The message may be received and processed by MME 106 via vCU 104'. In response, MME 106 may select GW-C 108 and send to GW-C 108 a message indicating a create session request (step 2 of FIG. 4A). GW-C 108 may receive the message and thereby obtain the create session request for processing.

Here, GW-C 108 may perform a Gx credit-control process with PCRF 112. GW-C 108 may send to PCRF 112 a message indicating a Gx credit-control request—initial (step 3 of FIG. 4A). PCRF 112 may receive this message for processing and, in response, and send to GW-C 108 a message indicating a Gx credit-control answer—initial (step 4 of FIG. 4A). The Gx credit-control answer may include one or more indications indicating whether support exists for a modified Gy credit-control process with OCS 120. The modified Gy credit-control process that is indicated may include an asynchronous initial Gy transaction according to some implementations of the present disclosure.

In some implementations, the one or more indications indicating that support exists for the modified Gy credit-control process (e.g. which includes the asynchronous initial Gy transaction) may further indicate whether to send the Gy credit-control request to OCS 120 during an attach procedure associated with the attach request for UE 102 (e.g. when UE 102 roams in a non-home or visited network). In addition, or as an alternative, the one or more indications indicating that support exists for the modified Gy credit-control process (e.g. which includes the asynchronous initial Gy transaction) may further indicate whether to send the Gy credit-control request to OCS 120 in response to receiving a user data packet for UE 102 as a notification (e.g. a first chargeable data packet) (e.g. when UE 102 operates in a home network). In some implementations, when the one or more indications indicating that support exists for the modified Gy credit-control process are excluded or not present in the Gx credit-control answer, then the modified Gy credit-control process with OCS 120 is not supported, but rather a "standard Gy credit-control process" with OCS 120 is available (see e.g. the method of FIG. 2). In the specific implementation as indicated in FIG. 4A, the Gx credit-control answer—initial in step 4 may include a first indication referred to as an "OCS Start Flag" which may be set to a first value of "0"=asynchronous initial Gy transaction "on attach" or a second value of "1"=asynchronous initial Gy transaction "on data." The OCS Start Flag may be included as a new AVP in the messaging. If this flag or AVP is not received, GW-C 108 may be configured to utilize its local configurations.

In the present scenario of FIG. 4A, the first indication or OCS Start Flag is set to the first value of "1" for indicating the asynchronous initial Gy transaction "on data." Accordingly, GW-C 108 may operate in accordance with the instructing indication to perform the asynchronous initial Gy transaction "on data." In some implementations, as is the case of FIG. 4A, the asynchronous initial Gy transaction "on data" will be initiated by GW-C 108 in response to receiving a user data packet as a notification (e.g. a first chargeable data packet) forwarded from GW-U 110.

Accordingly, after obtaining the Gx credit-control answer from PCRF 112, GW-C 108 may select GW-U 110 as the user plane for the session for UE 102. GW-C 108 may send to GW-U 110 a message indicating an Sx session establishment request for establishing a session with GW-U 110 (step 5 of FIG. 4A). The message indicating the Sx session establishment request may include rules for provisioning GW-U 110 for handling data traffic for UE 102. In some implementations, the Sx session establishment request may include a PDR, a FDR, or both. However, the Sx session establishment request will exclude a URR based on granted quota of units associated with a subscriber of UE 102, as such data have not (yet) been received from OCS 120. GW-U 110 may receive this message and process the Sx session establishment request, and send to GW-C 108 an Sx session establishment response (step 6 of FIG. 4A). GW-C 108 may receive this message and thereby obtain the Sx session establishment response.

Subsequently, GW-C 108 may send to GW-U 110 a message indicating an Sx session modification request for modifying the session (step 7 of FIG. 4A). In some implementations, the Sx session modification request may include a PDR, a FDR, or both. In addition, the Sx session modification request may include a new flag (for an Apply Action) indicating "Notify First Data Packet" (NFDP: 1) for notifying GW-C 108 of the first chargeable data packet in the session for UE 102. In some implementations, the NFDP may be set to a first value of "0"=notification OFF, or a second value of "1"=notification ON. GW-U 110 may be provisioned accordingly, for forwarding to GW-C 108 the receipt of the first chargeable data packet (e.g. using a FAR). The forwarding of the first chargeable data packet may be used to trigger the Gy transaction towards OCS 120. GW-U 110 may receive this message and process the Sx session modification request, and send to GW-C 108 a message indicating an Sx session modification response (step 8 of FIG. 4A). GW-C 108 may receive the message from GW-U 110 and process the Sx session modification response.

GW-C 108 may then send to MME 106 a message indicating a create session response (step 9 of FIG. 4A). Specifically, this message may indicate a GTPv2 Create_Session_Response which is sent on the S11 interface. As is apparent, GW-C 108 may send this message to MME 106 prior to sending to OCS 120 a Gy credit-control request, as well as prior to obtaining from OCS 120 a Gy credit-control answer to the Gy credit-control request. The message indicating the create session response to MME 106 may prompt an attach accept or reject of the attach request for UE 102. MME 106 may receive this message and process the create session response. MME 106 may then send to vCU 104' a message indicating an initial context setup request, and further indicating an attach accept or reject associated with the attach request for UE 102 (step 10 of FIG. 4A). The vCU 104' may receive the message and processing the initial context setup request, and send to MME 106 a message indicating an initial context setup response (step 11 of FIG. 4A). Further processing (e.g. the establishing of a default bearer) causes UE 102 to send to MME 106 via vCU 104' a message indicating an attach complete, which indicates completion of the attach procedure (step 12 of FIG. 4A).

Upon completion of the attach procedure and the establishment of the default bearer, UE 102 may send the IPv6 NS towards GW-C 108 via GW-U 110 as part of a neighbor discovery procedure (step 13 of FIG. 4A). This data packet will not be considered as a chargeable data packet, as it is by default destined towards GW-C 108. GW-C 108 may respond with a Router Advertisement (RA) towards UE 102.

Subsequently, sometime during operation, a first chargeable data packet in the session for UE 102 may be received at GW-U 110 in the UL (step 14 of FIG. 4A) or the DL (step 15 of FIG. 4A). As described earlier, GW-U 110 may be provisioned for forwarding the receipt of the first chargeable data packet to GW-C 108. Accordingly, GW-U 110 may forward the receipt of the first chargeable data packet to GW-C 108 (step 16 of FIG. 4A). GW-C 108 may receive the first chargeable data packet of the session for UE 102 forwarded from GW-U 110. GW-C 108 may perform a packet inspection of the first chargeable data packet, for identifying a specific rating group associated with the first chargeable data packet. The packet inspection may involve, for example, a stateful packet inspection (SPI), a deep packet inspection (DPI), or both.

In response to receiving the first chargeable data packet, GW-C 108 may send to OCS 120 a message indicating a Gy credit-control request—initial (CCR-I) (step 17 of FIG. 4A). This credit-control request may be for requesting a quota of units (e.g. a resource usage quota to be reserved) associated with the subscriber of UE 102. The Gy credit-control request may be for the rating group identified by the packet inspection. Note that this message marks the asynchronous initiating or triggering of the process. Again, GW-C 108 may perform this modified Gy credit-control process in accordance with the one or more indications in the Gx credit-control answer—initial from PCRF 112 (see e.g. previous step 4 of FIG. 4A). OCS 120 may receive the message in step 17 and begin processing the Gy credit-control request. At GW-C 108, a delay in receiving a Gy credit-control answer from OCS 120 will occur, largely due to transport and processing delays at the Diameter servers of OCS 120. User data packets may be buffered at GW-C 108 until the Gy credit-control answer is received. Subsequently, OCS 120 may send to GW-C 108 a message indicating a Gy credit-control answer—initial (step 18 of FIG. 4A). GW-C 108 may receive this message and thereby obtain the Gy credit-control answer. In the example scenario of FIG. 4A, the Gy credit-control answer in step 18 indicates a successful response ("2XX"). Here, the Gy credit-control answer may include a granted quota of units associated with the subscriber of UE 102, for example, for the specified rating group according to multiple service credit-control (MSCC).

Figure 4B:
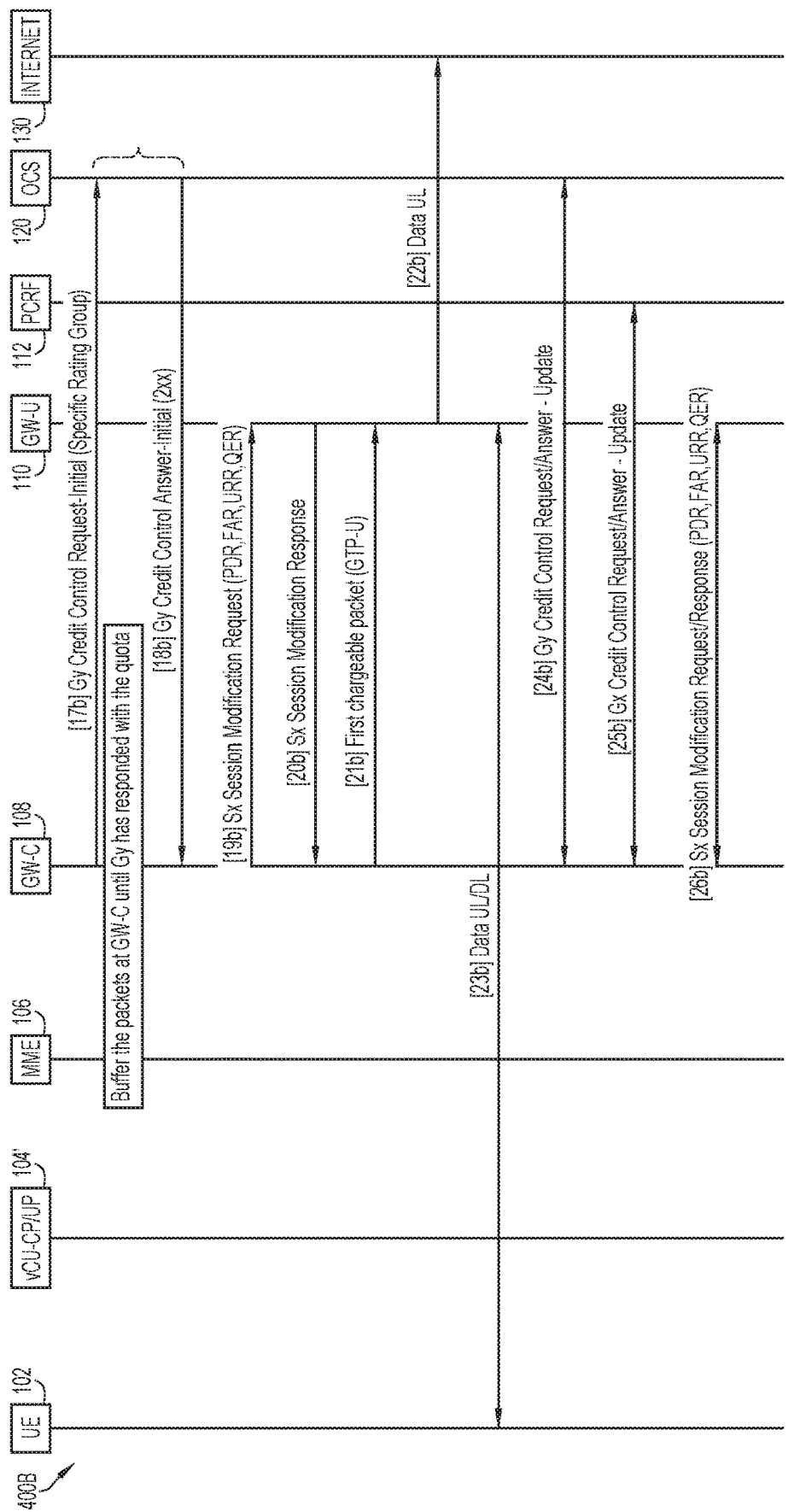
FIG. 4B is a message flow diagram for describing a continuation of the message flow of FIG. 4A, for the case where a successful answer is received in the modified Gy credit-control process with the OCS.

FIG. 4B is a message flow diagram 400B for describing a continuation of the message flow of FIG. 4A, for the case where a successful answer is received in the modified Gy credit-control process with OCS 120. In FIG. 4B, it is illustrated that GW-C 108 sends to OCS 120 the message indicating the Gy credit-control request—initial and OCS 120 sends to GW-C 108 the message indicating the Gy credit-control answer—initial ("2XX") which includes a granted quota of units (steps 17b and 18b of FIG. 4B which correspond to steps 17 and 18 of FIG. 4A). After obtaining the Gy credit-control answer having the granted quota of units in step 18*b*, GW-C 108 may send to GW-U 110 a message indicating an Sx session modification request for modifying the session (step 19*b* of FIG. 4B). The Sx session modification request may include one or more rules and/or actions for provisioning GW-U 110 in relation to the session for UE 102 for steady-state user data packet processing. In particular, the Sx session modification request may include a PDR, an FAR, a URR, as well as a Quality of Service (QoS) Enforcement Rule (QER) for provisioning GW-U 110 in relation to the session for UE 102. The URR may be based on the granted quota of units obtained from the Gy credit-control answer. GW-U 110 may receive this message and process the Sx session modification request, and send to GW-C 108 a message indicating an Sx session modification response (step 20*b* of FIG. 4B). GW-C 108 may receive the message from GW-U 110 to thereby obtain the Sx session modification response.

Reviewing above steps 17*b* through 20*b* of FIG. 4B, upon a successful response ("2XX") from OCS 120 and a valid quota from a Granted Service Unit (GSU), the Sx session in GW-U 110 may be modified with updated rules including PDR, FAR, URR, and QER. This may be needed in order to inform GW-U 110 about the granted quota obtained from OCS 120 for usage reporting, as well as to update the forwarding information towards the S1-U and SGi interfaces.

Subsequently, GW-C 108 may forward the buffered user data packet(s) to GW-U 110 for communication (step 21*b* of FIG. 4B). Data may be communicated from GW-U 110 for the UL (step 22*b* of FIG. 4B) as well as the DL (step 23*b* of FIG. 4B). GW-C 108 may send to OCS 120 a message indicating a credit-control request—update for providing one or more updates (step 24*b* of FIG. 4B). OCS 120 may receive the message and process the credit-control request—update, and send to GW-C 108 a message indicating a credit-control answer—update (also step 24*b* of FIG. 4B). GW-C 108 may send to PCRF 112 a message indicating a credit-control request—update for providing one or more updates (step 25*b* of FIG. 4B). PCRF 112 may receive the message and process the credit-control request—update, and send to GW-C 108 a message indicating a credit-control answer—update (also step 25*b* of FIG. 4B). GW-C 108 may receive the message and thereby obtain the credit0control answer—update for processing. GW-C 108 may send to GW-U 110 a message indicating an Sx session modification request (step 26*b* of FIG. 4B). GW-U 110 may receive the message and process the Sx session modification request, and send to GW-C 108 a message indicating an Sx session modification response (also step 26*b* of FIG. 3B). GW-C 108 may receive the message and thereby obtain the Sx session modification request for processing.

Again, in some circumstances in relation to FIG. 4A, OCS 120 may respond with a failure code (e.g. in the ranges of "3XX," "4XX," or "5XX"). According to some implementations, the failures may be handled in a graceful manner to terminate a session or fallback to local configurations of GW-C 108 for appropriate treatment. An unsuccessful response may be either at the command (or session) level (e.g. FIG. 4C) or at the service (MSCC) (or flow) level (e.g. FIG. 4D).

Figure 4C:
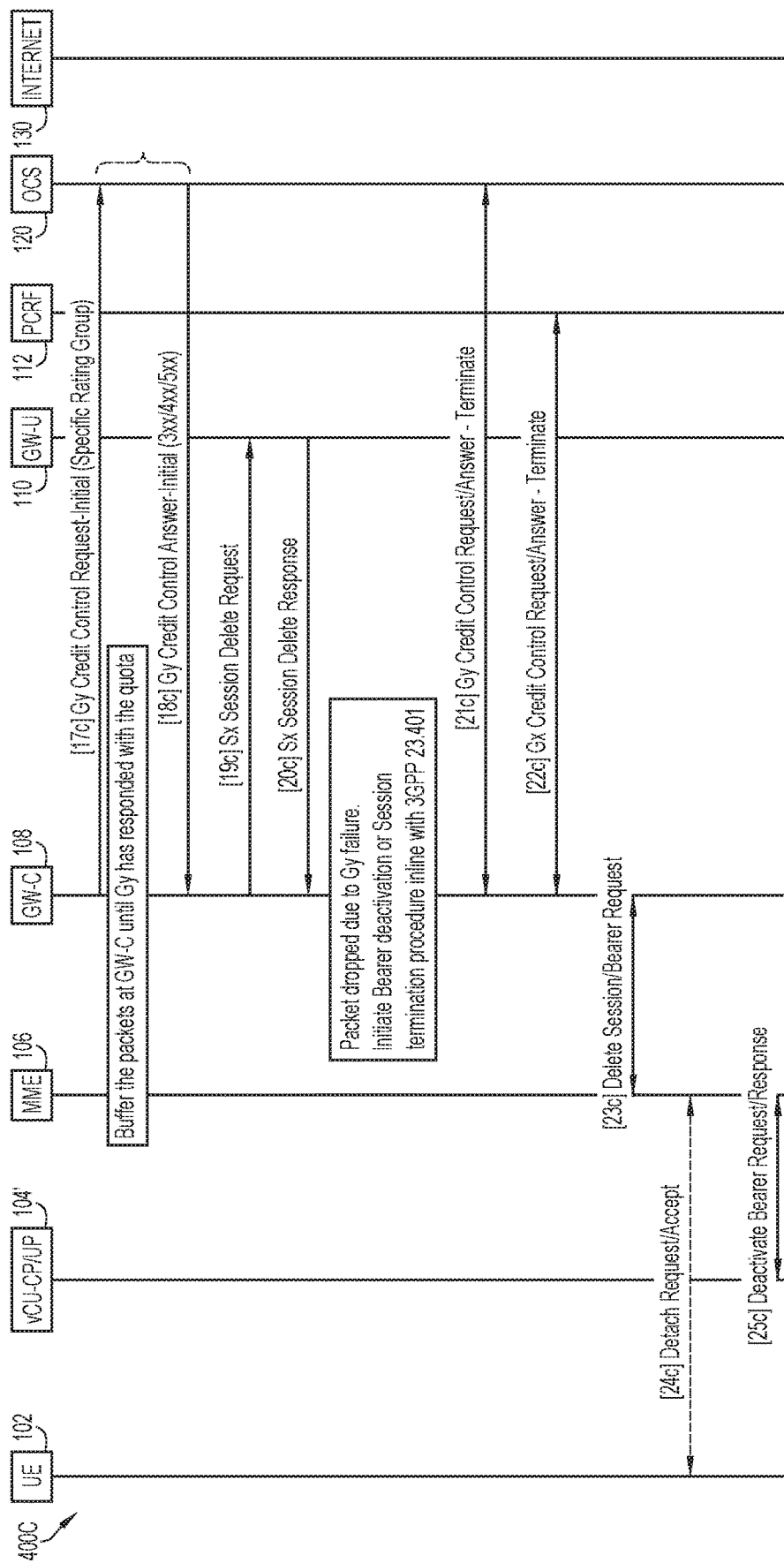
FIG. 4C is a message flow diagram for describing a continuation of the message flow of FIG. 4A, for the case where a negative response or failure is received (at a command level) in the modified Gy credit-control process with the OCS.

FIG. 4C is a message flow diagram 400C for describing a continuation of the message flow of FIG. 4A, for the case where a negative response or failure (at the command level) is received in the modified Gy credit-control process with OCS 120. In general, if a failure code is received at the command level and if there is no explicit configuration or locally-configured policy to allow the user data packets through at GW-C 108, the Sx session is gracefully deleted, UL data packets are dropped, and the Gx transactions along with the session is gracefully deleted.

In FIG. 4C, it is illustrated that GW-C 108 sends to OCS 120 the message indicating the Gy credit-control request—initial and OCS 120 sends to GW-C 108 the message indicating the Gy credit-control answer—initial (e.g. in the ranges of "3XX," "4XX," or "5XX") (steps 17*c* and 18*c* of FIG. 4C which correspond to steps 17 and 18 of FIG. 4A). After obtaining the Gy credit-control answer indicating the negative response or failure, GW-C 108 may send to GW-U 110 a message indicating an Sx session delete request for deleting the session (step 19*c* of FIG. 4C). GW-U 110 may receive this message and process the Sx session delete request, and send to GW-C 108 a message indicating an Sx session delete response (step 20*c* of FIG. 4C). GW-C 108 may receive the message from GW-U 110 to thereby obtain the Sx session delete response for processing.

GW-C 108 may send to OCS 120 a message indicating a credit-control request—terminate for termination (step 21*c* of FIG. 4C). OCS 120 may receive the message and process the credit-control request—terminate, and send to GW-C 108 a message indicating a credit-control answer—terminate (also step 21*c* of FIG. 4C). GW-C 108 may send to PCRF 112 a message indicating a credit-control request—terminate for termination (step 22*c* of FIG. 4C). PCRF 112 may receive the message and process the credit-control request—terminate, and send to GW-C 108 a message indicating a credit-control answer—terminate (also step 22*c* of FIG. 4C). GW-C 108 may receive the message and thereby obtain the credit-control answer—terminate for processing. Subsequently, GW-C 108 may send to MME 106 a message indicating a delete session/bearer request (step 23*c* of FIG. 4C). MME 106 may receive the message and process the delete session/bearer request, and send to GW-C 108 a message indicating a delete session/bearer response (also step 23*c* of FIG. 4C). GW-C 108 may receive the message and thereby obtain the delete session/bearer request for processing. Subsequently, MME 106 may send a message indicating a detach request to vCU 104' and/or UE 102 (step 24*c* of FIG. 4C). vCU 104'/UE 102 may receive the message and process the detach request, and send to MME 106 a message indicating a detach accept (also step 24*c* of FIG. 4C). MME 106 may receive the message and thereby obtain the detach accept for processing. Subsequently, MME 106 may send a message indicating a deactivate bearer request to vCU 104' (step 25*c* of FIG. 4C). vCU 104' may receive the message and process the deactivate bearer request, and send to MME 106 a message indicating a deactivate bearer response (also step 25*c* of FIG. 4C). MME 106 may receive the message and thereby obtain the deactivate bearer response for processing.

Figure 4D:
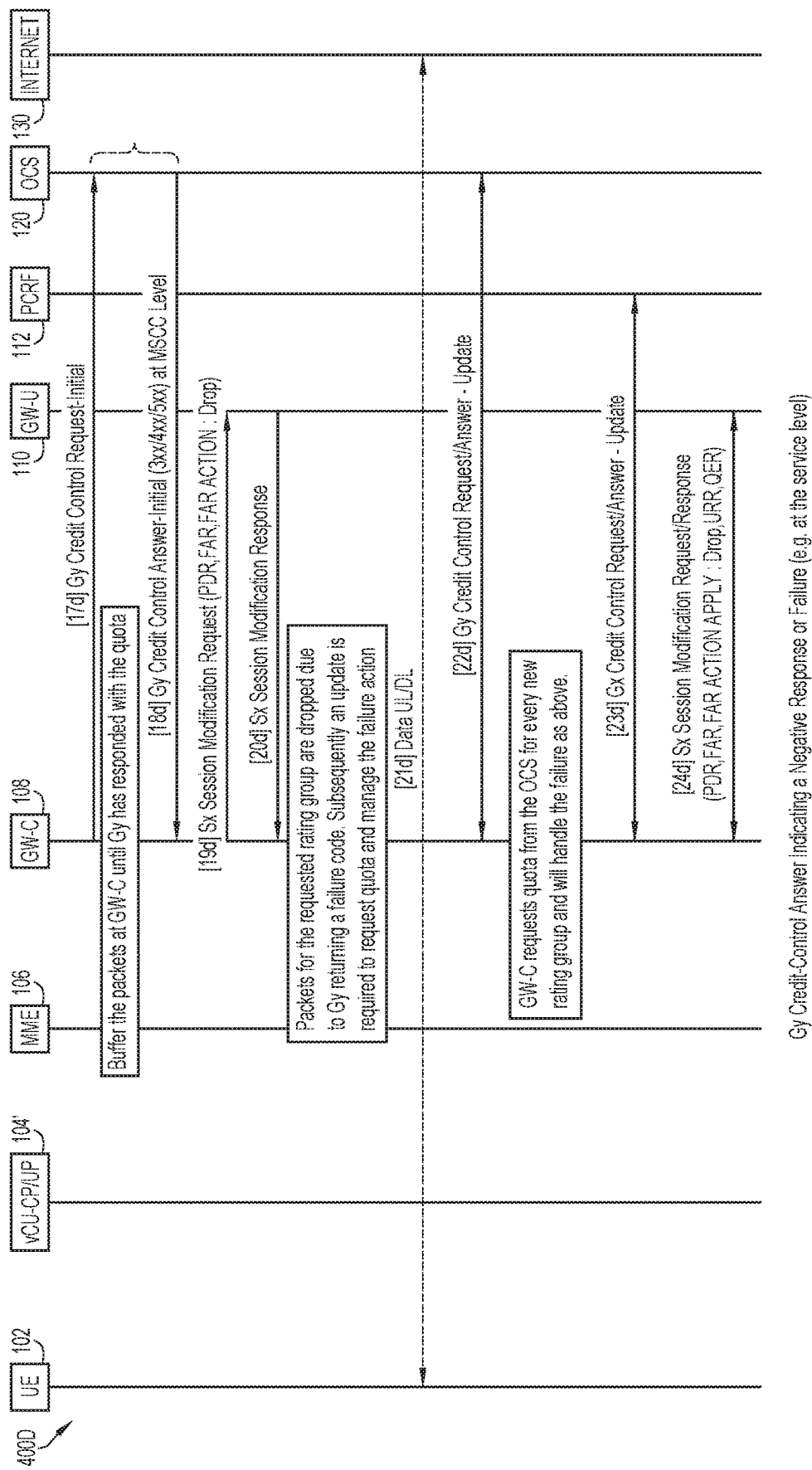
FIG. 4D is a message flow diagram for describing a continuation of the message flow of FIG. 4A, where a negative response or failure is received (at a service level) in the modified Gy credit-control process with the OCS.

FIG. 4D is a message flow diagram 400D for describing a continuation of the message flow of FIG. 4A, where a negative response or failure (at the service level) is received in the modified Gy credit-control process with OCS 120. In general, if a failure code is received at the MSCC level or bearer level, the Sx session may be modified with a FAR Action Apply set to "Drop" so that the flow alone is terminated or blacklisted without impacting the complete subscriber session and the rest of valid rating groups.

In FIG. 4D, it is illustrated that GW-C 108 sends to OCS 120 the message indicating the Gy credit-control request—initial and OCS 120 sends to GW-C 108 the message indicating the Gy credit-control answer—initial (e.g. in the ranges of "3XX," "4XX," or "5XX") (steps 17*d* and 18*d* of FIG. 4D which correspond to steps 17 and 18 of FIG. 4A).

After obtaining the Gy credit-control answer indicating the negative response or failure at the MSCC level, GW-C 108 may send to GW-U 110 a message indicating an Sx session modification request for modifying the session (step 19*d* of FIG. 4D). The Sx session modification request may include one or more rules and/or actions for provisioning GW-U 110 in relation to the session for UE 102. In particular, the Sx session modification request may include a PDR and a FAR, with a FAR action="Drop." GW-U 110 may receive this message and process the Sx session modification request, and send to GW-C 108 a message indicating an Sx session modification response (step 20*d* of FIG. 4D). GW-C 108 may receive the message from GW-U 110 to thereby obtain the Sx session modification response for processing. Here, user data packets for the requested rating group are dropped; subsequently, an update is required to request a quota and manage the failure.

Data may be communicated for the UL as well as the DL (step 21*d* of FIG. 4D). GW-C 108 may send to OCS 120 a message indicating a credit-control request—update for providing one or more updates (step 22*d* of FIG. 4D). OCS 120 may receive the message and process the credit-control request—update, and send to GW-C 108 a message indicating a credit-control answer—update (also step 22*d* of FIG. 4D). Note that GW-C 108 requests quota from OCS 120 for every new rating group and will handle the failure per the above. Next, GW-C 108 may send to PCRF 112 a message indicating a credit-control request—update for providing one or more updates (step 23*d* of FIG. 4D). PCRF 112 may receive the message and process the credit-control request—update, and send to GW-C 108 a message indicating a credit-control answer—update (also step 23*d* of FIG. 4D). GW-C 108 may receive the message and thereby obtain the credit-control answer—update for processing. Then, GW-C 108 may send to GW-U 110 a message indicating an Sx session modification request (step 24*d* of FIG. 4D). The Sx session modification request may include one or more rules and/or actions for provisioning GW-U 110 in relation to the session for UE 102. In particular, the Sx session modification request may include a PDR, a FAR, with a FAR action="Drop," a URR, and a QER. GW-U 110 may receive this message and process the Sx session modification request, and send to GW-C 108 a message indicating an Sx session modification response (also step 24*d* of FIG. 4D). GW-C 108 may receive the message from GW-U 110 to thereby obtain the Sx session modification response for processing.

Figure 5A:
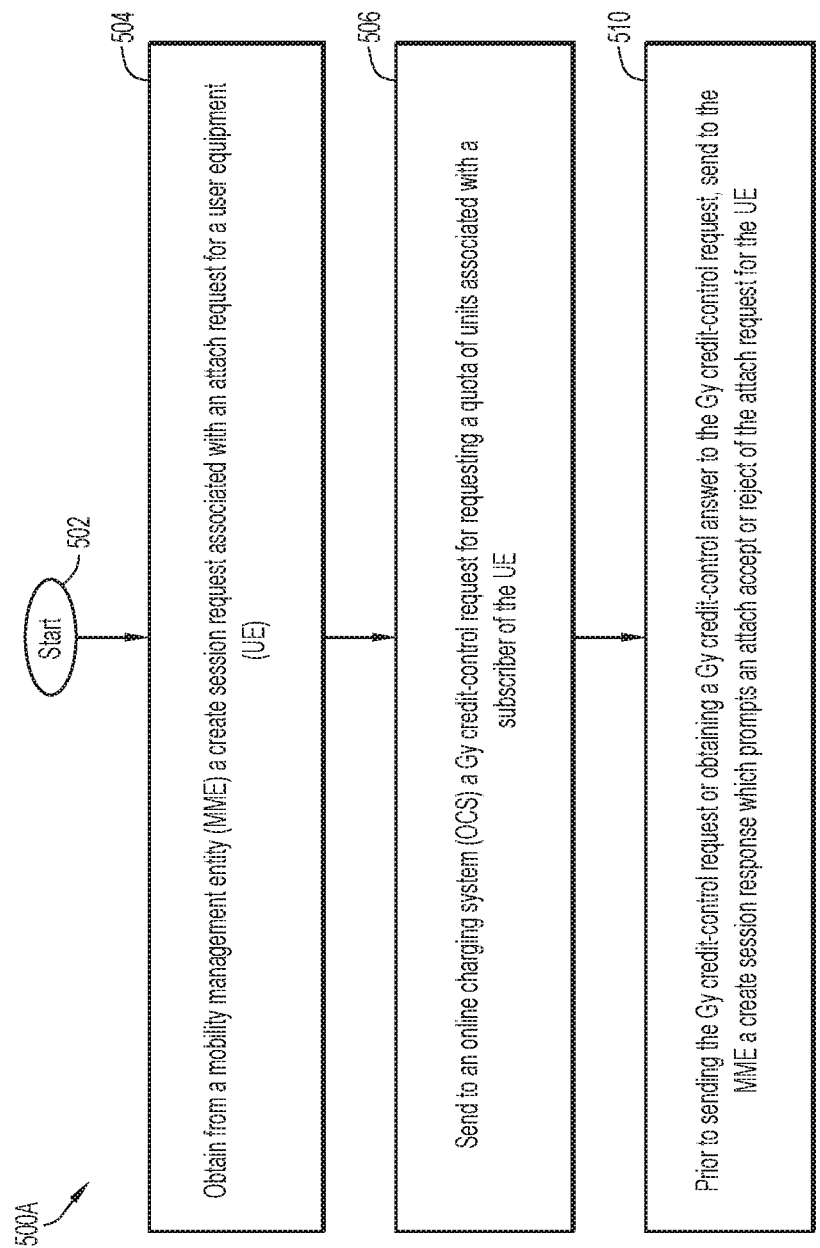
FIG. 5A is a flowchart for describing a method for use in attach and call setup procedures for a UE in a mobile network according to some implementations of the present disclosure, where the attach and call setup procedure involves a modified Gy credit-control process with the OCS.

FIG. 5A is a flowchart 500A for describing a method for use in attach and call setup procedures for a UE in a mobile network (e.g. the mobile network of FIG. 1) according to some implementations of the present disclosure, where the attach and call setup procedure involves a modified Gy credit-control process with the OCS. The method may be performed by a network node operative as a control plane gateway or GW-C in a mobile network. The method may be embodied in a computer program product which includes a non-transitory computer readable medium and instructions stored in the non-transitory computer readable medium, where the instructions are executable by one or more processors of the network node.

Beginning at a start block 502A of FIG. 5A, the control plane gateway may obtain from an MME a create session request associated with an attach request for a UE (step 504 of FIG. 5A). The control plane gateway may send to an OCS a Gy credit-control request for requesting a quota of units (e.g. a resource usage quota to be reserved) associated with a subscriber of the UE (step 506 of FIG. 5A). Prior to sending the Gy credit-control request or obtaining a Gy credit-control answer to the Gy credit-control request, the control plane gateway may send to the MME a create session response for prompting an attach accept or reject of the attach request for the UE (step 508 of FIG. 5A). In some implementations, the Gy credit-control request may be sent to the OCS during an attach procedure associated with the attach request for the UE. In some implementations, the Gy credit-control request may be sent to the OCS in response to receiving a user data packet of the session for the UE as a notification. Here, the user data packet may be a first chargeable data packet which is forwarded from a user plane gateway.

Figure 5B:
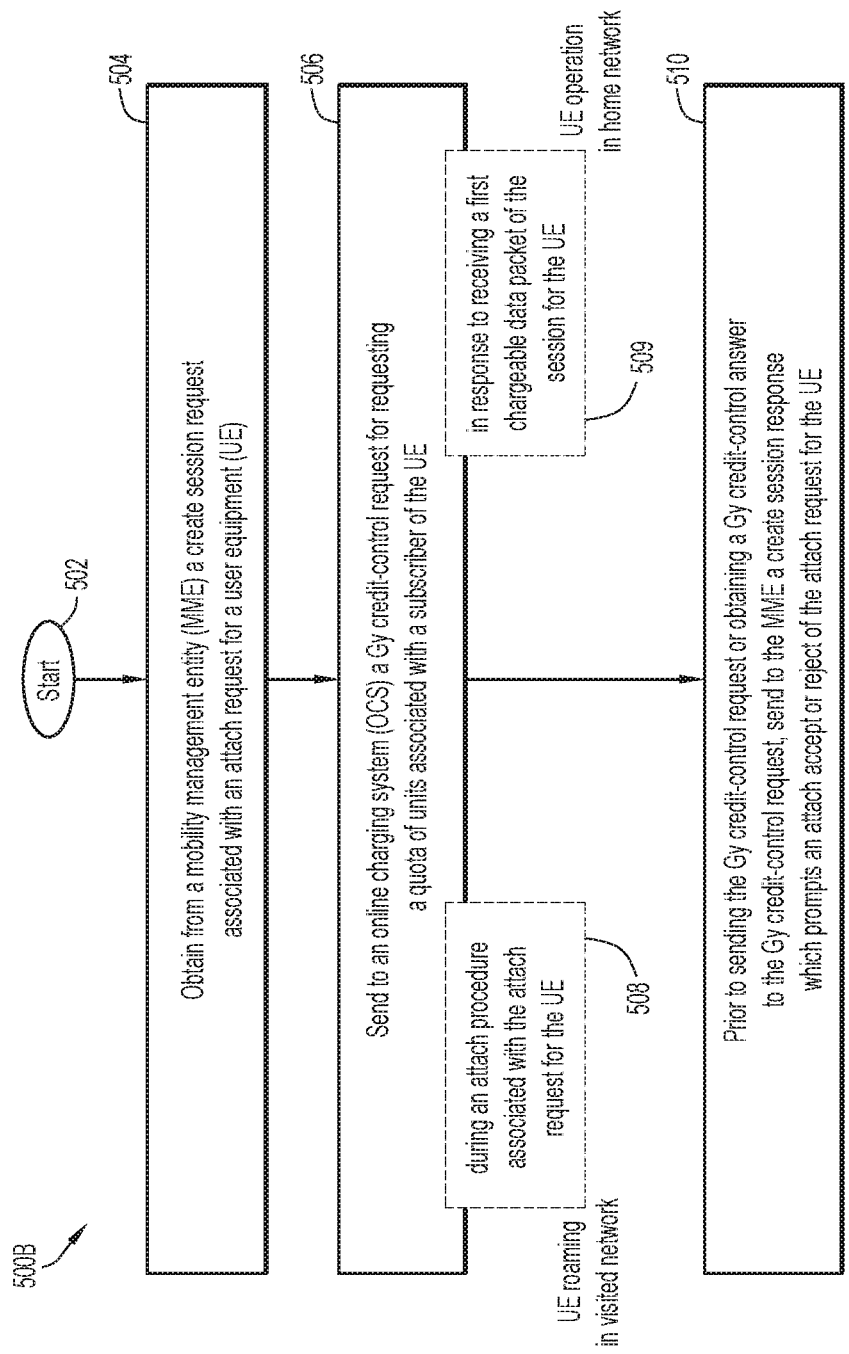
FIG. 5B is a flowchart for describing a method for use in attach and call setup procedures for a UE in a mobile network according to some implementations of the present disclosure, which may be considered a more specific approach to the method of FIG. 5A.

FIG. 5B is a flowchart 500B for describing a method for use in an attach and call setup procedure for a UE in a mobile network (e.g. the mobile network of FIG. 1) according to some implementations of the present disclosure. The method of FIG. 5B includes the same steps 504, 506, and 510 of the method of FIG. 5A, and may be considered a more specific approach of the method of FIG. 5A. The method may be performed by a network node operative as a control plane gateway or GW-C in a mobile network. The method may be embodied in a computer program product which includes a non-transitory computer readable medium and instructions stored in the non-transitory computer readable medium, where the instructions are executable by one or more processors of the network node.

Beginning at a start block 502 of FIG. 5B, the control plane gateway may obtain from an MME a create session request associated with an attach request for a UE (step 504 of FIG. 5B). The control plane gateway may send to an OCS a Gy credit-control request for requesting a quota of units (e.g. a resource usage quota to be reserved) associated with a subscriber of the UE (step 506 of FIG. 5B). In some implementations, when the UE is roaming in a non-home or visited network, the control plane gateway may (be instructed to) operate to send the Gy credit-control request to the OCS during the attach procedure (e.g. triggered in response to obtaining the create session request associated with the attach request, for example, after initial session establishment with the user plane gateway) (step 508 of FIG. 5B). In some implementations, when the UE is operating in a home network, the control plane gateway may (be instructed to) operate to send the Gy credit-control request to the OCS in response to receiving a first chargeable data packet of the session for the UE (e.g. forwarded from the user plane gateway) (step 509 of FIG. 5B). Prior to sending the Gy credit-control request or obtaining a Gy credit-control answer to the Gy credit-control request, the control plane gateway may send to the MME a create session response which prompts an attach accept or reject of the attach request for the UE (step 510 of FIG. 5B).

Figure 6:
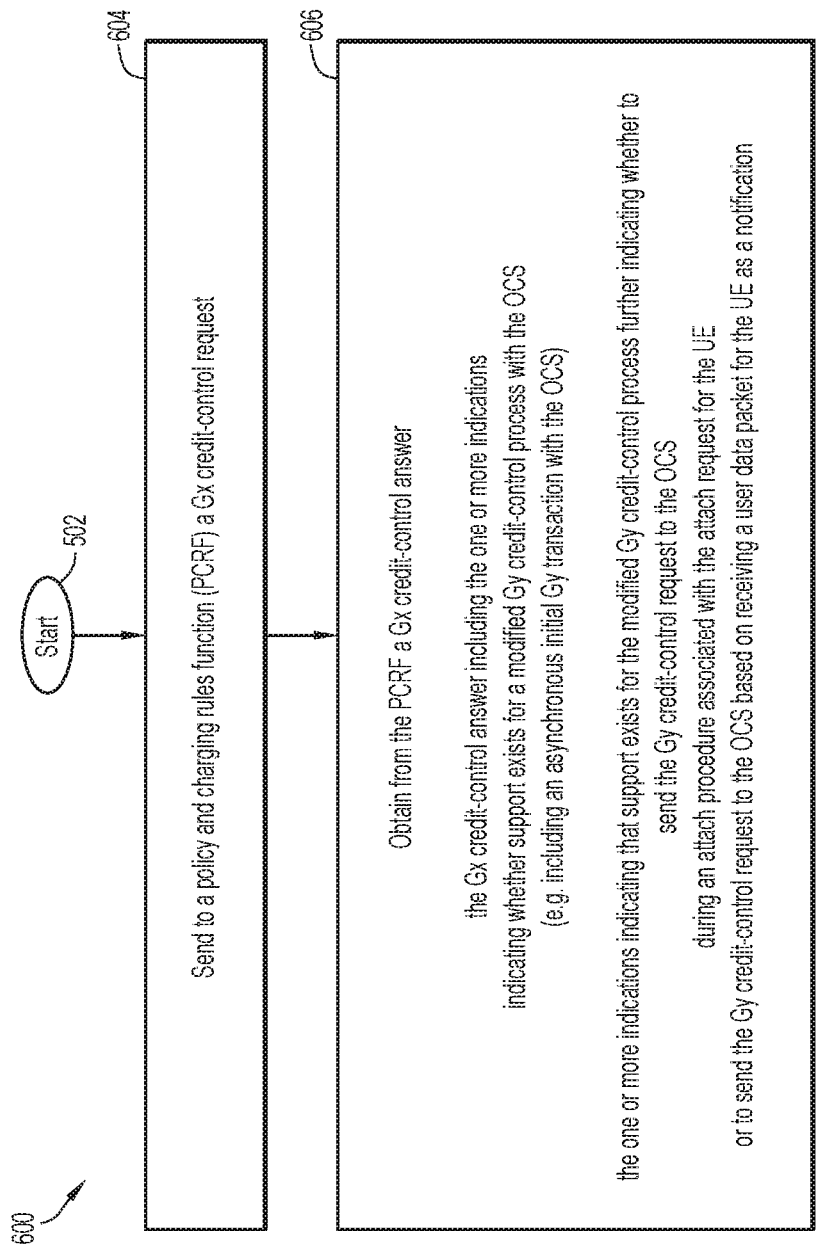
FIG. 6 is a flowchart for describing a method for use in attach and call setup procedures for a UE in a mobile network according to some implementations of the present disclosure and, more particularly, a method for use in a Gx credit-control process involving a Policy and Charging Rules Function (PCRF) of the mobile network during the attach and call setup procedures according to the present disclosure.

FIG. 6 is a flowchart 600 for describing a method for use in attach and call setup procedures for a UE in a mobile network (e.g. the mobile network of FIG. 1) according to some implementations of the present disclosure. More particularly, the flowchart 600 of FIG. 6 describes a method for use in a Gx credit-control process with a PCRF during the attach and call setup procedures according to the present disclosure. The method may be included in the method of FIG. 5A or 5B, and may directly follow step 504 of FIG. 5A or 5B. The method may be performed by a network node operative as a control plane gateway or GW-C in a mobile network. The method may be embodied in a computer program product which includes a non-transitory computer readable medium and instructions stored in the non-transitory computer readable medium, where the instructions are executable by one or more processors of the network node.

Beginning at a start block 602 of FIG. 6, the control plane gateway may send to a PCRF a Gx credit-control request (step 604 of FIG. 6). The control plane gateway may obtain from the PCRF a Gx credit-control answer (step 606 of FIG. 6). The Gx credit-control answer may include one or more indications indicating whether support exists for a modified Gy credit-control process with the OCS.

In some implementations, the one or more indications indicating that support exists for the modified Gy credit-control process may further indicate whether to send the Gy credit-control request to the OCS during an attach procedure associated with the attach request for the UE. In addition, or as an alternative, the one or more indications indicating that support exists for the modified Gy credit-control process may further indicate whether to send the Gy credit-control request to the OCS in response to receiving a user data packet for the UE as a notification (e.g. a first chargeable data packet).

In some implementations, when the one or more indications indicating that support exists for the modified Gy credit-control process are excluded or not present, then the modified Gy credit-control process with the OCS is not supported, but rather a standard Gy credit-control process with the OCS is available.

In some implementations, when the UE is roaming in a non-home or visited network, the one or more indications of the Gx credit-control answer indicate that support exists for the modified Gy credit-control process to send the Gy credit-control request to the OCS during an attach procedure associated with the attach request for the UE, and the control plane gateway operates in accordance with these one or more indications. In addition, or as an alternative, when the UE is operating in a home network, the one or more indications of the Gx credit-control answer indicate that support exists for the modified Gy credit-control process to send the Gy credit-control request to the OCS in response to receiving a user data packet for the UE as a notification, and the control plane gateway operates in accordance with these one or more indications.

In some implementations, the Gx credit-control answer from the PCRF may include one or more additional indications indicating a manner in which to process one or more user data packets of the session for the UE at a user plane gateway, for any user data packets received prior to re-provisioning of the user plane gateway responsive to a Gy credit-control answer from the OCS. These one or more additional indications may indicate initial user data packet processing according to one of (1) "transmit" (e.g. communicate or forward one or more received user data packets as normal); (2) "buffer" (e.g. buffer the one or more received user data packets until further notice); or (3) "drop" (e.g. drop the one or more received user data packets until further notice).

Figure 7:
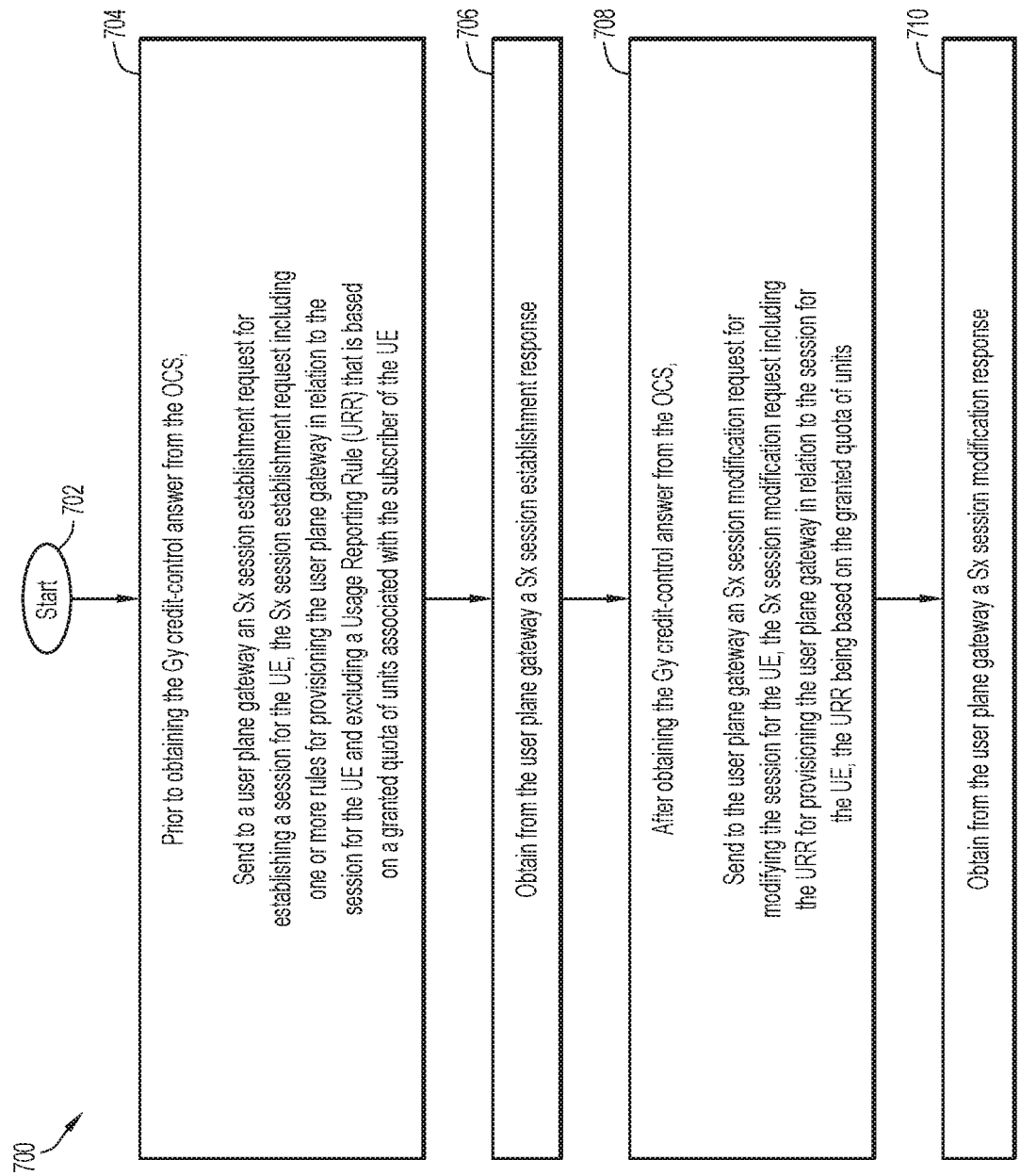
FIG. 7 is a flowchart for describing a method for use in attach and call setup procedures for a UE in a mobile network according to some implementations of the present disclosure and, more particularly, a method for use in Sx session establishment and/or modification procedures with a user plane gateway of the mobile network during the attach and call setup procedures according to the present disclosure.

FIG. 7 is a flowchart 700 for describing a method for use in attach and call setup procedures for a UE in a mobile network (e.g. the mobile network of FIG. 1) according to some implementations of the present disclosure. More particularly, the flowchart 700 of FIG. 7 describes a method for use in an Sx session establishment and/or modification procedures with a user plane gateway during the attach and call setup procedures. The method may be included in the method of FIG. 5A or 5B and 6, and may follow the method of FIG. 6. The method may be performed by a network node operative as a control plane gateway or GW-C in a mobile network. The method may be embodied in a computer program product which includes a non-transitory computer readable medium and instructions stored in the non-transitory computer readable medium, where the instructions are executable by one or more processors of the network node.

Beginning at a start block 702 of FIG. 7, prior to sending the Gy credit-control request or obtaining the Gy credit-control answer to the Gy credit-control request, the control plane gateway may send to a user plane gateway an Sx session establishment request for establishing a session for the UE (step 704 of FIG. 7). The Sx session establishment request may include one or more rules for provisioning the user plane gateway in relation to the session for the UE. In some implementations, the Sx session establishment request may include a PDR, an FAR, or both. As a granted quota of units associated with the subscriber has not yet been received, the Sx session establishment request will exclude a URR based on the granted quota of units. In some implementations, the Sx session establishment request of step 704 may further include one or more rules for provisioning the user plane gateway for initial user data packet processing associated with the session for the UE, for any one or more user data packets received prior to a re-provisioning of the user plane gateway responsive to the Gy credit-control answer from the OCS. Subsequently, the control plane gateway may obtain from the user plane gateway an Sx session establishment response (step 706 of FIG. 7).

Message exchanges and associated processing are now described for the case where the Gy credit-control answer indicates a successful response. After obtaining the Gy credit-control answer which includes a granted quota of units (e.g. a reserved, resource usage quota), the control plane gateway may send to the user plane gateway an Sx session modification request for modifying the session for the UE (step 708 of FIG. 7). The Sx session modification request may include the URR based on the granted quota of units, for provisioning the user plane gateway in relation to the session for the UE. The control plane gateway may obtain from the user plane gateway an Sx session modification response (step 710 of FIG. 7).

Message exchanges and associated processing are now described for the case where the Gy credit-control answer indicates a negative response or failure. For one, the control plane gateway may send to the user plane gateway a message indicating a Gx session delete request for deleting the session for the UE and, in response, obtain from the user plane gateway a message indicating a Gx session delete response. In addition, the control plane gateway may send to the OCS a message indicating a credit-control request—terminate and, in response, obtain from the OCS a message indicating a credit-control answer—terminate. Further, the control plane gateway may send to the MME a message indicating a delete session request and, in response, obtain from the MME a delete session response.

Techniques and mechanisms for an asynchronous handling of Gy sessions in 3GPP based mobile networks, for example, 3GPP based mobile networks having an EPC and CUPS architectures, have been described. Such techniques and mechanisms may provide for or lead to a significant improvement in call setup time in these mobile networks. Notably, call setup time is an important Key Performance Indicator (KPI) for mobile network operators and is key to the growth of subscriber base (and hence, business growth). Call setup time is also a KPI that is used to benchmark the quality of the network and, hence, is an important KPI in the competitive landscape for mobile network operators.

The techniques and mechanisms of the present disclosure may be applied to and/or implemented in other networks as well, including next generation networks, such as Fifth Generation (5G) networks. For 5G, 3GPP specifications define a Service-Based Architecture (SBA) for control plane functionality that is delivered by way of a set of interconnected Network Functions (NFs). In brief, a 5G network may include a RAN and a 5G core network, where the 5G core network may include NFs such as an Access and Mobility Management Function (AMF), a Session Management Function (SMF), a Policy Charging Function (PCF), and a User Plane Function (UPF), as well as other NFs and repositories.

In the 5G environment, the AMF may interface with the SMF, and the SMF may interface with the PCF and a Charging Function (CHF), with processing and/or message exchanges that are similar to those described in relation to the message flow diagrams of FIGS. 3A-3D and FIGS. 4A-4D as well as the flowcharts of FIGS. 5A-5B, 6, and 7 as one ordinarily skilled in the art would readily appreciate. More particularly, with reference to the message flow diagrams of FIGS. 3A-3D and FIGS. 4A-4D, MME 106 may be replaced with an AMF, GW-C 108 may be replaced with an SMF, GW-U 110 may be replaced with a UPF, PCRF 112 may be replaced with a PCF, and OCS 120 having the OCF may be replaced with a CHF having an OCF, with processing and/or message exchanges that are similar to those previously described as one ordinarily skilled in the art would readily appreciate.

Figure 8:
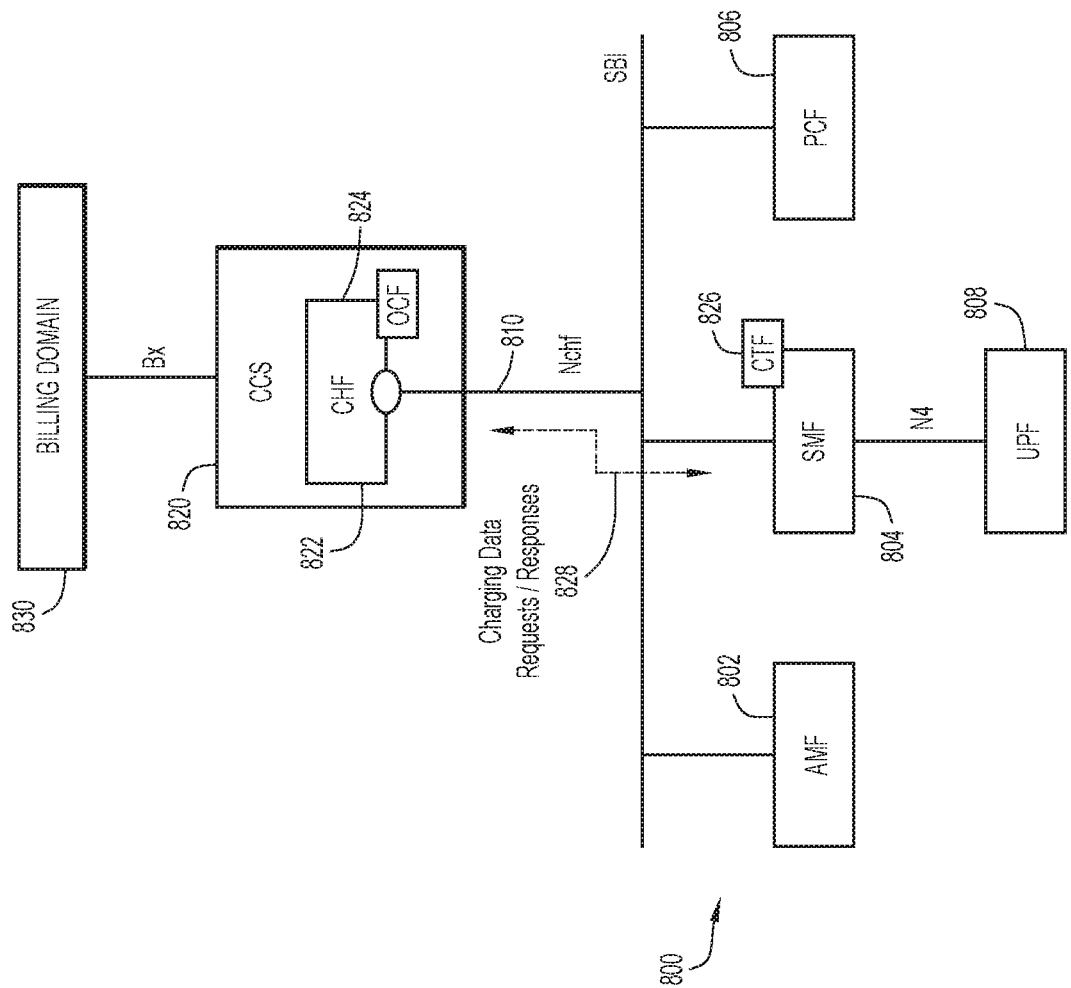
FIG. 8 is an illustrative representation of a network architecture which includes at least part of a Fifth Generation (5G) network within which techniques and mechanisms of the present disclosure may be implemented.

To further illustrate reference now to FIG. 8, a network architecture 800 of a 5G network includes an AMF 802, an SMF 804, and a PCF 806 which are interconnected via a Service-Based Interface (SBI) 810. SMF 804 may manage a session of UE at a UPF 808 over an N4 interface in an N4 session (or a Packet Forwarding Control Protocol or "PFCP" session). Online charging for the 5G network may involve a CHF 822 having an OCF 824. CHF 822 may be part of a charging system which is a Converged Charging System (CCS) 820 which may interface with a billing domain 830 (via a Bx interface). The Nchf interface is the service-based interface for CHF 822.

Service, operations, and procedures for 5G charging as described herein according to the present disclosure may be compatible with 3GPP specifications, such as 3GPP Technical Specification (TS) 32.290 and/or other related specifications. In particular, online charging and/or credit-control may be facilitated by SMF 804 (with use of a charging trigger function or "CTF" 826) with message exchanges 828 involving charging data requests and charging data responses. Messages in message exchanges 828 may include a charging data request—initial (which is associated with a corresponding charging data response—initial), a charging data request—update (which is associated with a corresponding charging data response—update), and a charging data request—termination (which is associated with a corresponding charging data response—termination).

Thus, a technique or mechanism of SMF 804 for use in a 5G-based mobile network may include obtaining from AMF 802 a create session request associated with an attach request for a UE; sending to (OCF 824 of) a CHF 822 a charging data request for requesting a quota of units (e.g. a resource usage quota to be reserved) associated with a subscriber of the UE; and prior to sending the charging data request or obtaining a charging data response to the charging data request, sending to AMF 802 a create session response for prompting an attach accept or reject of the attach request for the UE. The charging data request may be a charging data request—initial and the charging data response may be a charging data response—initial. The charging data request may be sent to (OCF 824 of) CHF 822 during an attach procedure associated with the attach request (e.g. initiated by SMF 804 after or in response to completion of initial session establishment and modification procedures with UPF 808) (e.g. when the UE is roaming in a non-home or visited network). Alternatively, the charging data request may be sent to (OCF 824 of) CHF 822 in response to receiving a user data packet of the session for the UE as a notification (e.g. a first chargeable data packet of the UE) (e.g. when the UE is operating in a home network).

Prior to sending the charging data request or obtaining the charging data response having a granted quota of units (e.g. a resource usage quota) associated with the subscriber of the UE, the technique or mechanism of SMF 804 may include sending to UPF 808 a session establishment request for establishing a session for the UE, where the session establishment request includes one or more rules for provisioning UPF 808 in relation to the session for the UE but excludes a URR based on the granted quota of units; and obtaining from the UPF 808 a session establishment response. After obtaining from (OCF 824 of) CHF 822 the charging data response which includes the granted quota of units, the technique or mechanism of SMF 804 may include sending to UPF 808 a session modification request for modifying the session for the UE, where the session modification request includes the URR based on the granted quota of units for provisioning UPF 808 in relation to the session for the UE; and obtaining from UPF 808 the session modification response.

More generally, a technique or mechanism of a CP entity for session management (e.g. a GW-C or SMF) for use in a mobile network may include obtaining from a CP entity for mobility management (e.g. an MME or AMF) a create session request (e.g. a credit-control request or charging data request) associated with a connection request (e.g. an attach request) for a user device; sending to an online charging function (e.g. of an OCS or CCS, etc.) a request for a quota of units (e.g. a resource usage quota to be reserved) associated with a subscriber of the user device; and prior to sending the request or obtaining a response (e.g. a credit-control answer or charging data response) to the request, sending to the CP entity for mobility management (e.g. the MME or AMF) a create session response for prompting an accept or reject of the connection request (e.g. the attach request) for the user device. The request (e.g. the credit-control request or charging data request) may be an initial request and the response may be an initial response. The request (e.g. the credit-control request or charging data request) may be sent to the online charging function (e.g. of an OCS or CCS, etc.) during a connection procedure (e.g. an attach procedure) associated with the connection request (e.g. initiated by the CP entity for session management after or in response to completion of initial session establishment and modification procedures with a user plane or "UP" entity). Alternatively, the request (e.g. the credit-control request or charging data request) may be sent to the online charging function (e.g. of an OCS or CCS, etc.) in response to receiving a user data packet of the session for the user device as a notification (e.g. a first chargeable data packet of the user device). Prior to sending the request or obtaining the response having a granted quota of units (e.g. a resource usage quota) associated with the subscriber of the user device, the technique or mechanism of the CP entity for session management (e.g. the GW-C or SMF) may include sending to the UP entity (e.g. a GW-U or UPF) a session establishment request for establishing a session for the user device, where the session establishment request includes one or more rules for provisioning the UP entity in relation to the session for the user device but excludes a usage reporting rule that is based on the granted quota of units; and obtaining from the UP entity (e.g. the GW-U or UPF) a session establishment response. After obtaining from the online charging function the response which includes the granted quota of units, the technique or mechanism of the CP entity for session management (e.g. the GW-C or SMF) may include sending to the UP entity (e.g. the GW-U or UPF) a session modification request for modifying the session for the user device, where the session modification request includes the usage reporting rule based on the granted quota of units for provisioning the UP entity (e.g. the GW-U or UPF) in relation to the session for the user device; and obtaining from the UP entity (e.g. the GW-U or UPF) the session modification response.

Figure 9:
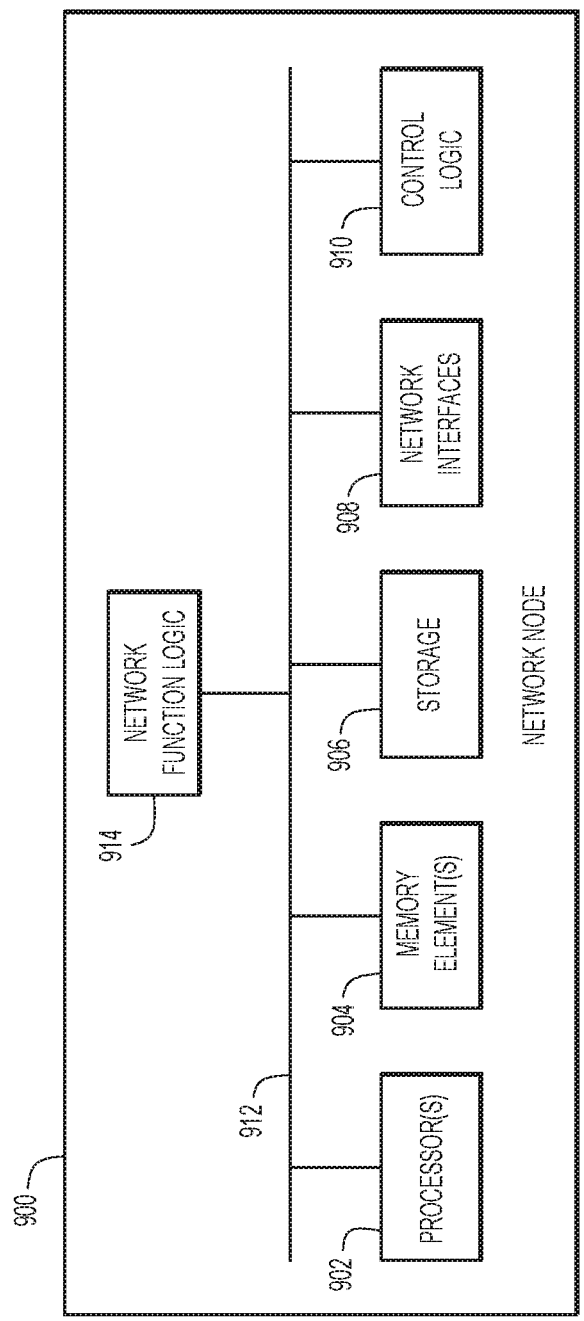
FIG. 9 is a schematic block diagram of a network node operative as a control plane entity for session management in a mobile network, such as a control plane gateway or session management function (SMF), according to some implementations of the present disclosure.

FIG. 9 is a schematic block diagram of a network node 900 (e.g. a compute or computing node or network equipment) operative as a control plane entity for session management, such as a control plane gateway (e.g. a GW-C or SAEGW-C) or SMF, according to some implementations of the present disclosure.

In various embodiments, network element functionality may be performed using any combination of network nodes. In various embodiments, network node 900 can be implemented as, for example, a data center network node such as a server, rack of servers, multiple racks of servers, etc., for a data center; or a cloud network node, which may be distributed across one or more data centers.

In some implementations, network node 900 may include one or more processors 902, one or more memory elements 904, storage 906, network interfaces 908, control logic 910 and network function logic 914. In some implementations, the processors 902 are at least one hardware processor configured to execute various tasks, operations and/or functions for network node 900 as described herein according to software and/or instructions configured for the network node 900. In some implementations, memory elements 904 and/or storage 906 are configured to store data, information, software, instructions, logic (e.g. any logic 910 and/or 914), data structures, combinations thereof, or the like for various embodiments described herein. Note that in some implementations, storage may be consolidated with memory elements (or vice versa), or may overlap/exist in any other suitable manner.

In some implementations, network interfaces 908 enable communication between for network node 900 and other network elements, systems, slices, etc. that may be present in the system to facilitate operations as discussed for various embodiments described herein. In some implementations, network interfaces 908 may include one or more Ethernet drivers and/or controllers, Fiber Channel drivers, and/or controllers, or other similar network interface drivers and/or controllers to enable communications for network node 900 within the system.

In some implementations, control logic 910 may include instructions that, when executed (e.g. via processors 902), cause for network node 900 to perform operations, which may include, but not be limited to, providing overall control operations of network node 900; cooperating with other logic, data structures, etc. provisioned for and/or maintained by network node 900; combinations thereof; or the like to facilitate various operations as discussed for various embodiments described herein.

In some implementations, bus 912 may be configured as an interface that enables one or more elements of network node 900 (e.g. processors 902, memory elements 904, logic, etc.) to communicate in order to exchange information and/or data. In at least one embodiment, bus 912 may be implemented as a fast kernel-hosted interconnect, potentially using shared memory between processes (e.g. logic, etc.), which may enable efficient communication paths between the processes.

In some implementations, network function logic 914 may include instructions that, when executed (e.g. via one or more processors 902) cause network node 900 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

The terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

In some implementations, a network may be associated with and/or provided by a single network operator or service provider and/or multiple network operators or service providers. In various embodiments, the network node may include and/or overlap with, in whole or in part, one or more packet data network(s) (e.g. one or more packet data networks). A network may offer communicative interfaces between various elements and may be further associated with any LAN, wireless local area network (WLAN), metropolitan area network (MAN), wide area network (WAN), virtual private network (VPN), RAN, virtual local area network (VLAN), enterprise network, Intranet, extranet, Low Power Wide Area Network (LPWAN), Low Power Network (LPN), M2M network, IoT Network, or any other appropriate architecture or system that facilitates communications in a network environment.

The terms 'UE', 'mobile device,' 'mobile radio device,' 'end device', 'user', 'subscriber' or variations thereof can be used herein interchangeably and are inclusive of devices used to initiate a communication, such as a computer, an electronic device such as an IoT device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first request could be termed a second request, and similarly, a second request could be termed a first request, without changing the meaning of the description, so long as all occurrences of the "first request" are renamed consistently and all occurrences of the "second request" are renamed consistently. The first request and the second request are both requests, but they are not the same request.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a control plane gateway for use in a mobile network,
obtaining from a mobility management entity (MME) a create session request associated with an attach request for a user equipment (UE);
sending to an online charging system (OCS) a Gy credit-control request—initial for requesting a quota of units associated with a subscriber of the UE; and
prior to sending the Gy credit-control request—initial or obtaining a Gy credit-control answer—initial to the Gy credit-control request—initial, sending to the MME a create session response for prompting an attach accept or reject of the attach request for the UE.

2. The method of claim 1, wherein the Gy credit-control request—initial is sent to the OCS during an attach procedure associated with the attach request.

3. The method of claim 1, wherein the Gy credit-control request—initial is sent to the OCS in response to receiving a user data packet of a session for the UE as a notification.

4. The method of claim 1, further comprising:
at the control plane gateway, prior to sending the Gy credit-control request—initial or obtaining the Gy credit-control answer—initial having a granted quota of units associated with the subscriber of the UE,
sending to a user plane gateway an Sx session establishment request for establishing a session for the UE, the Sx session establishment request including one or more rules for provisioning the user plane gateway in relation to the session for the UE and excluding a Usage Reporting Rule (URR) based on the granted quota of units; and
obtaining from the user plane gateway an Sx session establishment response.

5. The method of claim 4, further comprising:
at the control plane gateway, after obtaining from the OCS the Gy credit-control answer initial which includes the granted quota of units,
sending to the user plane gateway an Sx session modification request for modifying the session for the UE, the Sx session modification request including the URR based on the granted quota of units for provisioning the user plane gateway in relation to the session for the UE; and
obtaining from the user plane gateway an Sx session modification response.

6. The method of claim 4, further comprising:
at the control plane gateway, after obtaining from the OCS the Gy credit-control answer initial indicating a negative response or failure,
sending to the user plane gateway a Gx session delete request for deleting the session for the UE, and obtaining from the user plane gateway a Gx session delete response;
sending to the OCS a credit-control request—terminate, and obtaining from the OCS a credit-control answer—terminate; and
sending to the MME a delete session request, and obtaining from the MME a delete session response.

7. The method of claim 4, further comprising:
at the control plane gateway, prior to sending the Gy credit-control request—initial or obtaining the Gy credit-control answer—initial to the Gy credit-control request—initial,
sending to the user plane gateway an Sx session modification request for modifying the session for the UE, the Sx session modification request including one or more rules for provisioning the user plane gateway in relation to the session for the UE, the one or more rules being for forwarding receipt of a first chargeable data packet of the session for the UE as a notification;
obtaining from the user plane gateway an Sx session modification response;
after provisioning the user plane gateway, receiving the first chargeable data packet of the session for the UE forwarded from the user plane gateway; and
wherein the Gy credit-control request—initial is sent in response to receiving the first chargeable data packet of the session for the UE forwarded from the user plane gateway.

8. The method of claim 7, further comprising:
at the control plane gateway,
performing a packet inspection of the first chargeable data packet, for identifying a rating group associated with the first chargeable data packet,
wherein the Gy credit-control request—initial includes the rating group associated with the first chargeable data packet.

9. The method of claim 1, further comprising:
at the control plane gateway,
sending to a policy and charging rules function (PCRF) a Gx credit-control request; and
obtaining from the PCRF a Gx credit-control answer including one or more indications indicating whether support exists for a modified Gy credit-control process with the OCS.

10. The method of claim 7, wherein the one or more indications indicating whether support exists for the modified Gy credit-control process further indicates whether to send the Gy credit-control request—initial to the OCS during an attach procedure associated with the attach request or to send the Gy credit-control request—initial to the OCS in response to receiving a user data packet of a session for the UE as a notification.

11. The method of claim 10, wherein:
when the UE is roaming in a non-home or visited network, the one or more indications indicate that support exists for the modified Gy credit-control process to send the Gy credit-control request—initial to the OCS during an attach procedure associated with the attach request for the UE, and
when the UE is operating in a home network, the one or more indications indicate that support exists for the modified Gy credit-control process to send the Gy credit-control request initial to the OCS in response to receiving the user data packet for the UE as the notification.

12. The method of claim 10, wherein the one or more indications comprise one or more first indications, and wherein the Gx credit-control answer includes one or more second indications indicating a manner in which to process one or more user data packets of the session for the UE at a user plane gateway for user data packets received prior to a re-provisioning of the user plane gateway responsive to the Gy credit-control answer—initial, the one or more second indications indicating one of: transmit, buffer, or drop.

13. A network node for a control plane gateway comprising:
one or more processors;
one or more interfaces configured to connect for communication in a mobile network;
the one or more processors being configured to:
obtain from a mobility management entity (MME) a create session request associated with an attach request for a user equipment (UE);
send to an online charging system (OCS) a Gy credit-control request—initial for requesting a quota of units associated with a subscriber of the UE; and
prior to sending the Gy credit-control request—initial or obtaining a Gy credit-control answer—initial to the Gy credit-control request—initial, send to the MME a create session response for prompting an attach accept or reject of the attach request for the UE.

14. The network node of claim 13, wherein the one or more processors are further configured to:
  send the Gy credit-control request—initial during an attach procedure associated with the attach request for the UE, or
  send the Gy credit-control request—initial in response to receiving a user data packet of a session for the UE as a notification.

15. The network node of claim 13, wherein the one or more processors are further configured to:
  prior to sending the Gy credit-control request—initial or obtaining the Gy credit-control answer—initial,
    send to a user plane gateway an Sx session establishment request for establishing a session for the UE, the Sx session establishment request including one or more rules for provisioning the user plane gateway in relation to the session for the UE and excluding a Usage Reporting Rule (URR) based on a granted quota of units; and
    obtain from the user plane gateway an Sx session establishment response.

16. The network node of claim 15, wherein the one or more processors are further configured to:
  after obtaining from the OCS the Gy credit-control answer—initial,
    send to the user plane gateway an Sx session modification request for modifying the session for the UE, the Sx session modification request including the URR based on the granted quota of units for provisioning the user plane gateway in relation to the session for the UE; and
    obtain from the user plane gateway an Sx session modification response.

17. A computer program product comprising:
  a non-transitory computer readable medium;
  instructions in the non-transitory computer readable medium, the instructions being executable by one or more processors to implement a control plane gateway for:
    obtaining from a mobility management entity (MME) a create session request associated with an attach request for a user equipment (UE);
    sending to an online charging system (OCS) a Gy credit-control request—initial for requesting a quota of units associated with a subscriber of the UE; and
    prior to sending the Gy credit-control request—initial or obtaining a Gy credit-control answer—initial to the Gy credit-control request—initial, sending to the MME a create session response for prompting an attach accept or reject of the attach request for the UE.

18. The computer program product of claim 17, wherein the instructions are executable by the one or more processors to implement the control plane gateway further for sending to the OCS the Gy credit-control request—initial during an attach procedure associated with the attach request, or for sending to the OCS the Gy credit-control request—initial in response to receiving a user data packet of a session for the UE as a notification.

19. The computer program product of claim 17, wherein the instructions are executable by the one or more processors to implement the control plane gateway further for:
  prior to sending the Gy credit-control request—initial or obtaining the Gy credit-control answer—initial to the Gy credit-control request—initial
    sending to a user plane gateway an Sx session establishment request for establishing a session for the UE, the Sx session establishment request including one or more rules for provisioning the user plane gateway in relation to the session for the UE and excluding a Usage Reporting Rule (URR) based on a granted quota of units associated with the subscriber of the UE; and
    obtaining from the user plane gateway an Sx session establishment response.

20. The computer program product of claim 19, wherein the instructions are executable by the one or more processors to implement the control plane gateway further for:
  after obtaining from the OCS the Gy credit-control answer—initial,
    sending to the user plane gateway an Sx session modification request for modifying the session for the UE, the Sx session modification request including the URR based on the granted quota of units for provisioning the user plane gateway in relation to the session for the UE; and
    obtaining from the user plane gateway an Sx session modification response.

\* \* \* \* \*